United States Patent [19]

Sakakiyama et al.

[11] Patent Number: 5,573,475
[45] Date of Patent: Nov. 12, 1996

[54] FAILURE DETECTING SYSTEM AND METHOD FOR AUTOMATIC TRANSMISSION

[75] Inventors: Ryuzo Sakakiyama, Tokyo; Kiminaga Shirakawa, Kitatsuru; Kazunari Tezuka, Niiza, all of Japan

[73] Assignee: Fuji Jukogyo Kabushiki Kaisha, Tokyo, Japan

[21] Appl. No.: 491,593

[22] Filed: Jun. 16, 1995

Related U.S. Application Data

[62] Division of Ser. No. 282,310, Jul. 29, 1994, Pat. No. 5,486,147.

[30] Foreign Application Priority Data

| Jul. 29, 1993 | [JP] | Japan | 5-188196 |
| Jul. 29, 1993 | [JP] | Japan | 5-188197 |
| Aug. 30, 1993 | [JP] | Japan | 5-214284 |
| Dec. 27, 1993 | [JP] | Japan | 5-332180 |

[51] Int. Cl.$^6$ .......................... B60K 41/00; B60K 41/26
[52] U.S. Cl. .............................. 477/94; 477/96; 477/906; 192/4 A
[58] Field of Search ........................ 192/4 A; 477/94, 477/95, 96, 906

[56] References Cited

U.S. PATENT DOCUMENTS

| 3,942,614 | 3/1976 | Thompson | 192/4 A |
| 4,039,061 | 8/1977 | Pruvot et al. | 192/4 A |
| 4,253,348 | 3/1981 | Will et al. | 477/125 |
| 4,274,306 | 6/1981 | Yokoi et al. | 477/121 |
| 4,295,540 | 10/1981 | Hildebrecht | 477/73 X |
| 4,635,508 | 1/1987 | Tatsumi | 477/125 |
| 4,750,385 | 6/1988 | Yamamoto et al. | 477/96 X |

(List continued on next page.)

FOREIGN PATENT DOCUMENTS

| 517457 | 12/1992 | European Pat. Off. | 477/121 |
| 4040780 | 6/1991 | Germany | 477/121 |
| 4129286 | 3/1992 | Germany | 477/906 |
| 3000364 | 4/1991 | Japan | 477/121 |
| 4341658 | 11/1992 | Japan | 477/121 |

*Primary Examiner*—Charles A. Marmor
*Assistant Examiner*—Nathan O. Jensen
*Attorney, Agent, or Firm*—Beveridge, DeGrandi, Weilacher & Young, L.L.P.

[57] ABSTRACT

In case where an engine rotational detection signal from an ignition pulse generator is not appropriately detected even if an amount of induction air and a fuel injection amount are larger than predetermined values, an engine rotational signal failure is decided, and an automatic transmission is controlled in a state before the decision. Therefore, the automatic transmission control based on the engine rotational speed such as, for example, a speed shift control (ordinarily a shift control), a lockup control (ordinarily a lockup control, a smooth control), a line pressure control (ordinarily a line pressure control, a starting time control) can be appropriately controlled. Thus, the automatic transmission control can be executed based on the engine rotational speed. In case where any of the conditions of (1) when the cruise control signal is erroneously turned on in case where a vehicle speed is smaller than a value in the case of non operation of a cruise control, (2) when the cruise control signal which ought to be released is erroneously turned on at the time of turning a brake switch on, (1) when the cruise control signal is erroneously turned on in an "N" or "P" range, (4) when any of the paragraphs (1) to (3) is continued for a predetermined time, are satisfied, a failure of the cruise control set signal line is detected, and the automatic transmission control of the cruise control is prohibited. The normal state is recovered when an off signal of the cruise control set is detected in the above-described conditions. Accordingly, since a failure of the cruise control set signal line is reliably detected, the automatic transmission control is appropriately executed by using the cruise control signal. Thus, the automatic transmission control can be executed based on a cruise control signal.

14 Claims, 19 Drawing Sheets

U.S. PATENT DOCUMENTS

| | | | |
|---|---|---|---|
| 4,919,242 | 4/1990 | Muramatsu et al. | 192/4 A |
| 4,955,255 | 9/1990 | Yamaashi et al. | 477/906 X |
| 4,982,623 | 1/1991 | Yoshino et al. | 477/94 |
| 4,993,283 | 2/1991 | Kikuchi et al. | 477/96 |
| 5,052,247 | 10/1991 | Kato et al. | 477/906 |
| 5,088,353 | 2/1992 | Yoshida | 477/906 X |
| 5,117,710 | 6/1992 | Asano | 74/861 |
| 5,191,814 | 3/1993 | Ando et al. | 477/906 |
| 5,216,938 | 6/1993 | Yamaguchi | 477/906 |
| 5,291,803 | 3/1994 | Yamaguchi | 477/906 |
| 5,439,426 | 8/1995 | Nakashima | 477/125 |

FAILURE DETECTING SYSTEM AND METHOD FOR AUTOMATIC TRANSMISSION

This is a divisional of application Ser. No. 08/282,310, filed Jul. 29, 1994 which issued as U.S. Pat. No. 5,486,147, on Jan. 23, 1996.

BACKGROUND OF THE INVENTION

The present invention relates to a failure detecting system for an automatic transmission of a vehicle employing an engine rotational speed, a cruise control signal, a brake signal from a brake switch or a shift range switch operation signal from a shift range switch as one of control signals to control the automatic transmission.

An automatic transmission AT is fundamentally controlled to be shifted by regulating depression of an accelerator pedal and a traveling speed of a vehicle. Accordingly, in case where the vehicle travels in a drive (D) range, reduction gears can be shifted by positively depressing or releasing the accelerator pedal.

In a conventional automatic transmission, for example, in a drive (D) range, an optimum gear is selectively controlled from a vehicle speed at that time and a throttle opening according to a shift map storing a predetermined shift schedule as shown in FIG. 14.

As a lockup function of an automatic transmission a lockup clutch is engaged when a vehicle speed becomes higher than a predetermined value in a certain gear position such as, for example, in a third gear or an overdrive (fourth gear), to directly couple an output shaft of a torque converter to an output shaft of an engine. In other cases, the lockup clutch is released to connect the input shaft of the torque converter to the output shaft of the engine.

The lockup is released to utilize a function of the torque converter thereby to achieve smooth starting, smooth accelerating or smooth speed shifting without engine knocking or stop at the time of starting, abruptly accelerating, speed shifting the vehicle.

However, in a state that a load is low and an engine rotational speed is high, the torque converter is locked up thereby to prevent loss of power due to a slip of the torque converter and hence to prevent a decrease in fuel consumption.

A cruise control unit so controls an opening of a throttle valve as to maintain a certain vehicle speed set by a driver as a desired traveling speed thereby controlling in response to a road state.

As the typical automatic transmission control to execute as described above, Japanese Utility Model Application Laid-Open 63-115558 discloses an internal combustion engine with an abnormality detector for Judging an abnormality based on a rotational signal from a rotation detector for electrically detecting a rotational speed of the internal combustion engine and a fuel amount signal from a fuel amount detector for detecting a fuel supply amount to the internal combustion engine.

In the above-described internal combustion engine with the abnormality detector, it is determined that an engine rotational speed signal line is when an engine rotational speed is smaller than a predetermined value at a certain vehicle speed or more. However, even if an engine stop occurs at a certain vehicle speed or more, it is erroneously detected that the failure occurs at the engine rotational speed signal line.

In such a case, it becomes impossible to detect a failure of an ignition pulse generating an engine rotational speed detection signal to be supplied to the engine rotational speed signal line. Furthermore, there are disadvantages that the automatic transmission control based on the engine rotational speed such as, for example, a gear shift control, a lockup control, a line pressure control can not be appropriately controlled.

As the typical automatic transmission control to execute as described above, Japanese Utility Model Application Laid-Open 63-137038 discloses an automatic transmission controller in which hunting of the vehicle speed due to a gear shifting during a cruise control traveling is prevented and a fail-safe control is performed when an abnormality of an automatic transmission occurs.

More specifically, the automatic transmission controller additionally provides a memory map storing a shift schedule for controlling the automatic transmission in response to a cruise control signal supplied from a cruise controller, in which map a hysteresis width is so set as to reduce the number of repetitions of down and up shifting.

In this case, since the number of times of gear shifting during the cruise control is reduced, hunching of the vehicle speed due to the gear shifting can be prevented, and a riding comfort can be improved.

In the conventional automatic transmission controller as described above, a vehicle can be traveled smoothly without shock in the case of shifting gear during the cruise control, but it does not have a fail-safe function in case where the cruise control signal is, for example, erroneously generated even though the cruise control is not performed by the cruise controller.

Usually, the automatic transmission controller functions a gear shifting control, a lockup control, an overrunning clutch control (namely, engine brake control), etc. Therefore, if a fail-safe function is not provided, these functions are erroneously operated when a cruise control signal is erroneously generated.

In a conventional automatic transmission, for example, in a drive (D) range, an optimum gear is selected based on a vehicle speed and a throttle opening at that time, from a shift schedule map storing a predetermined shift schedule as shown in FIG. 14.

Further, in such an automatic transmission control, detection signals from various detecting sensors are input to a controller to perform a lockup control, an overrunning clutch control, a line pressure control, an auto-pattern select control, a gear shift timing control, a transfer clutch control of four-wheel drive as well as the above-described gear shift control are executed.

Japanese Patent Application Laid-Open 1-145234 discloses a cruise control of a vehicle using a brake switch signal.

More specifically, as shown in FIG. 15, a detection signal SG1 from a vehicle speed sensor is input to a cruise controller 1. When a check switch 4 is turned on, a CPU 5 enters in an input waiting state of a brake switch signal SG2. When a brake pedal is once depressed and then released, the CPU 5 decides that a series of ON/OFF signals of the brake switch 3 are input. In this case, a cruise control allowance flag is set, while in case the CPU 5 decides no input of the series of signals, the CPU 5 does not set the cruise control allowance flag.

Then, whether the cruise control is requested by various switches 6 for the cruise control or not is decided. In case where the cruise control is requested, whether the cruise control allowance flag is set or not is decided, and in case the flag is set, the cruise control is executed.

In case where the cruise control allowance flag is not set, a warning light is turned on to inform the gist, and cruise control is prohibited.

Thus, in such a cruise control unit for a vehicle, an error of the brake switch 3 is checked previously by the check switch 4 for requesting a signal check of the brake switch 3 before the cruise control. Therefore, the cruise control can be reliably executed by the brake switch 3.

However, in the above-described conventional cruise control unit for a vehicle, the check switch 4 is additionally needed to check the brake switch 3, thereby causing a complicated structure.

Since the brake switch 3 is checked by the operation of the check switch 4 only before the cruise control, there is a disadvantage that the brake switch 3 cannot be checked, in case where the cruise control is not executed. Moreover, a failure of the brake switch is not executed when a braking operation is required in various running states of the vehicle such as, for example, at the time of decelerating.

Further, a shift lever for operating a range shift of an automatic transmission is connected to an inhibitor switch having a plurality of switches corresponding to the number of operating positions. When a range is selected by the operation of the shift lever, the corresponding switch generates a first level electric signal. Other switches not selected by the shift lever generate second level signals.

The positions of the shift lever includes, generally in the case of a four-speed automatic transmission, R (reverse), N (neutral), D (drive), 3 (third), 2 (second), 1 (low) and P (parking) of seven positions. The inhibitor switch for indicating the position of the shift lever includes seven switches each of which is closed (first level) when the corresponding position of the R, N, D, 3, 2, 1, L or P is selected by the shift lever, and opened (second level) when different positions are selected.

On the contrary, the inhibitor switch may include switches each of which opened in the case of the corresponding shift position and closed in the case of the different positions.

Therefore, any one of the seven switches is normally closed (opened) and the residual six switches are opened (closed). However, if at least one of the switches is troubled, or if an abnormality occurs at an interlocking member for operating to open or close the switch in cooperation with the shift lever, two or more switches might be simultaneously closed (opened), or all the switches might be simultaneously opened (closed). Such an abnormality causes an error in an automatic transmission control.

Switch might be, for example, instantaneously repeatedly opened/closed in an extremely short time due to a chattering when the switch is changed from open to close or vice versa. Further, in case where a mechanical member moves to sequentially close (open) one of the switches aligned in a moving direction of the mechanical member, the adjacent two switches might be simultaneously closed (opened) at a certain time point. This is normal. However, if it is conditioned to detect as an abnormality when two or more switches are simultaneously closed or all the switches are simultaneously opened, such a normal case as described above that the adjacent two switches are simultaneously closed, is erroneously determined as an abnormality.

With respect to this, Japanese Patent Application Laid-Open 63-34349 discloses a method for detecting a trouble of a gear position switch. That is, if a gear position switch does not generate an ON signal when a predetermined time is elapsed after a gear shifting is performed, it is returned to a position before the gear changing, and when the same operation as above is conducted predetermined times or more, the switch is decided to be a trouble.

However, in the above-described conventional method for detecting the trouble of the gear position switch, in case where the ON signal is not generated from the gear position switch, the gear is returned to the position before the gear shifting, and when the same operation as above is again conducted predetermined times or more, the switch is decided to be the trouble. Therefore, in the case of the trouble, it merely controls to return the position of the switch to the position before the gear shifting, an accurate automatic transmission control responsive to various traveling states of the vehicle is impossible.

SUMMARY OF THE INVENTION

An object of the present invention is to provide a failure detecting system for an engine rotational signal line connected to a controller for an automatic transmission of a vehicle which can reliably detect a failure of the engine rotational signal line thereby to appropriately control an operation of an automatic transmission control based on an engine rotational speed.

In order to achieve the above object, the present invention provides a failure detecting system for engine rotational signal line of an automatic transmission of a vehicle employing an engine rotational speed as one of control signals to control said automatic transmission, the system comprising:

engine speed detecting means for detecting said engine rotational speed;

air amount detecting means for detecting an amount of induction air; and transmission control prohibiting means for prohibiting a transmission control based on said engine rotational speed, when said amount of induction air detected by said air amount detecting means is larger than a predetermined value, and when said engine rotational speed detected by said engine speed detecting means continues to be smaller than a predetermined value for more than a predetermined time.

The present invention also provides a failure detecting system for an engine rotational signal line of an automatic transmission of a vehicle employing an engine rotational speed as one of input signals to control said automatic transmission, the system comprising:

engine speed detecting means for detecting said engine rotational speed;

air amount detecting means for detecting an amount of induction air;

vehicle speed detecting means for detecting a vehicle speed; and transmission control prohibiting means for prohibiting a transmission control based on said engine rotational speed, when said vehicle speed detected by said vehicle speed detecting means is larger than a predetermined value, when said amount of induction air detected by said air amount detecting means is larger than a predetermined value, and when said engine rotational speed detected by said engine speed detecting means continues to be smaller than a predetermined value for more than a predetermined time.

The present invention also provides a failure detecting system for an engine rotational speed signal line connected to a controller for an automatic transmission of a vehicle employing an engine rotational speed as one of input signals to control the automatic transmission, the system comprising:

engine speed detecting means for detecting said engine rotational speed;

fuel injection amount detecting means for detecting a fuel injection amount; and transmission control prohibiting means for prohibiting a transmission control based on said engine rotational speed, when said fuel injection amount detected by said fuel injection amount detecting means is larger than a predetermined value, and when said engine rotational speed detected by said engine speed detecting means continues to be smaller than a predetermined value for more than a predetermined time.

The present invention also provides a failure detecting system for an engine rotational signal line of an automatic transmission of a vehicle employing an engine rotational speed as one of control signals to control said automatic transmission, the system comprising:

engine speed detecting means for detecting said engine rotational speed;

vehicle speed detecting means for detecting a vehicle speed;

fuel injection amount detecting means for detecting a fuel injection amount; and transmission control prohibiting means for prohibiting a transmission control based on said engine rotational speed, when said vehicle speed detected by said vehicle speed detecting means is larger than a predetermined value, when said fuel injection amount detected by said fuel injection amount detecting means is larger than a predetermined value, and when said engine rotational speed detected by said engine speed detecting means continues to be smaller than a predetermined value for more than a predetermined time. According to the failure detecting system for the engine rotational signal speed line of the present invention, the automatic transmission control of the automatic transmission AT is prohibited in case where one of the following conditions is satisfied.

More specifically, (1) When the amount of intake air is larger than a predetermined value, the state that the engine rotational speed is smaller than a predetermined value is continued for a predetermined time.

(2) When the vehicle speed is larger than a predetermined value, the amount of intake air is larger than a predetermined value and the state that the engine rotational speed is smaller than a predetermined state is continued for a predetermined time.

(3) When the fuel injection amount is larger than a predetermined value, the state that the engine rotational speed is smaller than a predetermined value is continued for a predetermined time.

(4) When the vehicle speed is larger than a predetermined value, the fuel injection amount is larger than a predetermined value and the state that the engine rotational speed is smaller than a predetermined value is continued for a predetermined time.

In case where any of the above conditions (1) to (4) is satisfied, it is determined that a failure occurs on the engine rotational speed signal line, whereby the automatic transmission control based on the engine rotational speed is prohibited, and the state before the failure is detected is maintained.

Another object of the present invention is to provide a failure detecting system for a cruise control set signal line connected to a controller for an automatic transmission of a vehicle which can reliably detect a failure of a cruise control set signal line thereby to appropriately control an operation of an automatic transmission control in response to a cruise control signal.

In order to achieve the another object of the present invention, there is provided a failure detecting system for an automatic transmission of a vehicle employing a cruise control signal as one of input signals to control said automatic transmission, the system comprising:

vehicle speed detecting means for detecting a vehicle speed;

cruise control signal generating means for generating a cruise control signal so as to instruct a cruise control to said automatic transmission; and transmission control prohibiting means for prohibiting a transmission control based on said cruise control signal, when said vehicle speed detected by said vehicle speed detecting means is smaller than a predetermined value below which said cruise control is prohibited, and when said cruise control signal is generated from said cruise control signal generating means.

The present invention also provides a failure detecting system for an automatic transmission of a vehicle employing a cruise control signal as one of input signals to control said automatic transmission, the system comprising:

brake signal generating means for generating a brake signal when a brake switch is turned on;

cruise control signal generating means for generating a cruise control signal so as to instruct a cruise control to said automatic transmission; and transmission control prohibiting means for prohibiting a transmission control based on said cruise control signal, when said brake signal is generated from said brake signal generating mean, and when said cruise control signal is generated from said cruise control signal generating means.

The present invention also provides a failure detecting system for an automatic transmission of a vehicle employing a cruise control signal as one of control signals to control said automatic transmission, the system comprising:

cruise control signal generating means for generating a cruise control signal so as to instruct a cruise control to said automatic transmission;

shift signal generating means for generating a shift signal so as to instruct an appropriate gear position to said automatic transmission; and transmission control prohibiting means for prohibiting a transmission control based on said cruise control signal, when said shift signal from said shift signal generating means indicates a parking (P) or reverse (R) range, and when said cruise control signal is generated from said cruise control signal generating means.

The present invention also provides the failure detecting system, wherein said transmission control prohibiting means are for prohibiting a transmission control based on said cruise control signal, when said vehicle speed detected by said vehicle speed detecting means is smaller than a predetermined value below which said cruise control is prohibited, and when said cruise control signal is generated from said cruise control signal generating means for a predetermined time.

According to the failure detecting system for the cruise control set signal line of the present invention, the automatic transmission control of the automatic transmission AT is prohibited in case where one of the following conditions is satisfied.

More specifically, (1) When the cruise control signal is erroneously turned on in case where a vehicle speed is smaller than a value under which the operation of a cruise control is not performed.

(2) When the cruise control signal which ought to be released is erroneously turned on at the time of turning a brake switch on.

(3) When the cruise control signal is erroneously turned on in an "N" or "P" range.

(4) When any of the paragraphs (1) to (3) is continued for a predetermined time.

In case where any of the above conditions (1) to (4) is satisfied, it is determined that a failure occurs on the cruise control set signal line, whereby the automatic transmission control at the time of the cruise control is prohibited. However, a normal state is recovered when an off signal of the cruise control is detected after one of the above-described conditions is satisfied.

Still another object of the present invention is to provide a failure detecting system for a brake switch connected to a controller for an automatic transmission of a vehicle which can reliably detect a failure of a brake responsive to various running states thereby to appropriately control an operation of an automatic transmission control based on a brake switch signal.

The present invention also provides a failure detecting system for brake switch connected to a controller for an automatic transmission of a vehicle employing a brake signal from a brake switch as one of input signals to control said automatic transmission, the system comprising:

vehicle speed detecting means for detecting a vehicle speed;

brake signal detecting means for detecting a brake signal when said brake switch is turned on; and transmission control prohibiting means for prohibiting a transmission control based on said brake signal, when a number of times of how often said brake signal which ought to be detected has not been detected while said vehicle is decelerated from a predetermined speed to a zero speed reaches a predetermined number of times.

The present invention also provides the failure detecting system, wherein said transmission control prohibiting means are for prohibiting said transmission control based on said brake signal, when a deceleration rate of said vehicle obtained from said vehicle speed detected by said vehicle speed detecting means, and when a number of times of how often said brake signal which ought to be detected has not been detected reaches a predetermined number of times.

The present invention also provides the failure detecting system, wherein said transmission control prohibiting means are for prohibiting said transmission control based on said brake signal, when said vehicle speed detected by said vehicle speed detecting means is larger than a predetermined speed, when a deceleration rate of said vehicle obtained from said vehicle speed detected by said vehicle speed detecting means is larger than a predetermined value, and when said brake signal which ought to be detected i not detected.

The present invention also provides a failure detecting system for a brake switch connected to a controller for an automatic transmission of a vehicle employing a brake signal from a brake switch as one of control signals to control said automatic transmission, the system comprising:

brake signal detecting means for detecting a brake signal when said brake switch is turned on;

shift signal generating means for generating a shift signal so as to instruct an appropriate gear position to said automatic transmission; and transmission control prohibiting means for prohibiting a transmission control based on said brake signal, when said shift signal from said shift signal generating means indicates a change from a parking (P) range to a reverse (R) range, and when a number of times of how often said brake signal which ought to be detected has not been detected reaches a predetermined number of times.

According to the failure detecting system for the brake switch of the present invention, the automatic transmission control of the automatic transmission AT is prohibited in case where one of the following conditions is satisfied.

More specifically, (1) When a brake ON signal is not detected when the vehicle speed is decelerated until a vehicle is stopped, and when this phenomenon occurs continuously predetermined times.

(2) When a deceleration of the vehicle speed is larger than a predetermined value, the brake ON signal is not detected, and when this phenomenon occurs continuously predetermined times.

(3) In case where a vehicle speed is larger than a certain value, and the paragraph (2) is satisfied. (4) In a vehicle having a shift locking mechanism, when a R range is selected from a P range, absence of the brake ON signal continuously occurs predetermined times.

In case where any of the above conditions (1) to (4) is satisfied, it is determined that a failure occurs on the brake switch signal, the automatic transmission control in response to the brake switch signal is prohibited. However, a normal state is recovered when the brake ON signal is detected after one of the the above-described conditions is satisfied.

Still another object of the present invention is to provide a failure detecting system for a speed shift range switch signal line connected to a controller for an automatic transmission of a vehicle which can reliably detect a failure of a shift range switch responsive to various traveling states of the vehicle and can suitably conduct an operation of an automatic transmission control based on a shift range signal.

In order to achieve the above-described object, the present invention also provides a failure detecting system for an automatic transmission of a vehicle employing a shift range switch operation signal from a speed shift range switch as one of control signals to control said automatic transmission, the system comprising:

vehicle speed detecting means for detecting a vehicle speed;

range detecting means for detecting a speed shift range from said speed shift range switch when a vehicle speed detected by said vehicle speed detecting means is above a predetermined value; and automatic transmission control means for automatically controlling said automatic transmission in a state that a range to be automatic transmission controlled is regarded as being a "D" range when other speed shift range signal is not detected even after a predetermined time is elapsed after an "N" range is detected by said range detecting means.

The present invention also provides a failure detecting system for an automatic transmission of a vehicle employing a speed shift range switch operation signal from a speed shift range switch as one of control signals to control said automatic transmission, the system comprising:

vehicle speed detecting means for detecting a vehicle speed;

range detecting means for detecting a speed shift range from said speed shift range switch when a vehicle speed detected by said vehicle speed detecting means is above a predetermined value; and automatic transmission control means having display means for displaying a trouble of a "D" range when said "D" range is not detected but a "3" range is detected after an "N" range is detected by said range detecting means and for automatically controlling said automatic transmission so as to maintain said previously set range when a detection of said "D" range to be detected by said range detecting means is not conducted for a predetermined time.

The present invention as claimed in claim 3 provides a failure detecting system for an automatic transmission of a vehicle employing a speed shift range switch operation signal from a speed shift range switch as one of control signals to control said automatic transmission, the system comprising:

vehicle speed detecting means for detecting a vehicle speed;

range detecting means for detecting a speed shift range from said speed shift range switch signal line; and automatic transmission control means for automatically controlling said automatic transmission so as to maintain said previous range when said vehicle speed detected by said vehicle speed detecting means is above a predetermined value and when a detection of a range to be detected by said range detecting means is not conducted for a predetermined time.

The present invention also provides a failure detecting system for an automatic transmission of a vehicle employing a speed shift range switch operation signal from a speed shift range switch as one of control signals to control said automatic transmission, the system comprising range detecting means for detecting a speed shift range from said speed shift range switch;

start signal generating means for generating a start signal indicating a starting state of a starter for expediting a start of an engine for said vehicle; and automatic transmission control means for automatically controlling said automatic transmission so as to maintain said previous range in case where "P" or "N" range is not detected by said range detecting means when a start signal from said start signal generating means is "ON".

According to the failure detecting system for the shift range switch operation signal line of the present invention, the automatic transmission is controlled in a certain way in case where the certain conditions to determine a failure are satisfied.

More specifically, (1) No input state is continued for a predetermined time after the "N" range is detected when the vehicle is traveled at a predetermined vehicle speed or higher.

(2) No input state is continued for a predetermined time after the "3" range is detected in case where the "3" range is detected without the detection of the "D" range after the "N" range is detected when the vehicle is traveled at a predetermined vehicle speed or higher.

When the condition (1) id detected, it is regarded the current shift position is the "D" range, the automatic gear shift control for the "D" range is conducted. When the condition (2) is detected, a failure is displayed, and the previous shift range is maintained.

Further, (3) No input state of the drive range is elapsed for a predetermined time when the vehicle speed is a predetermined vehicle speed or higher.

(4) P or N range is not recognized when the starter switch is closed.

In case where any one of the above conditions (3) and (4) is satisfied, the range set previously is subsequently maintained.

Therefore, since the detection of the failure of the shift range switch signal line is reliably conducted, the automatic transmission is suitably controlled by using the shift range switch operation signal.

The nature, utility, and further features of this invention will be understood from the following detailed description with respect to preferred embodiments of the invention by referring the accompanying drawings, briefly described below.

DETAILED DESCRIPTION OF THE INVENTION

The embodiment of the present invention will be explained with reference to accompanying drawings.

Figure 1:
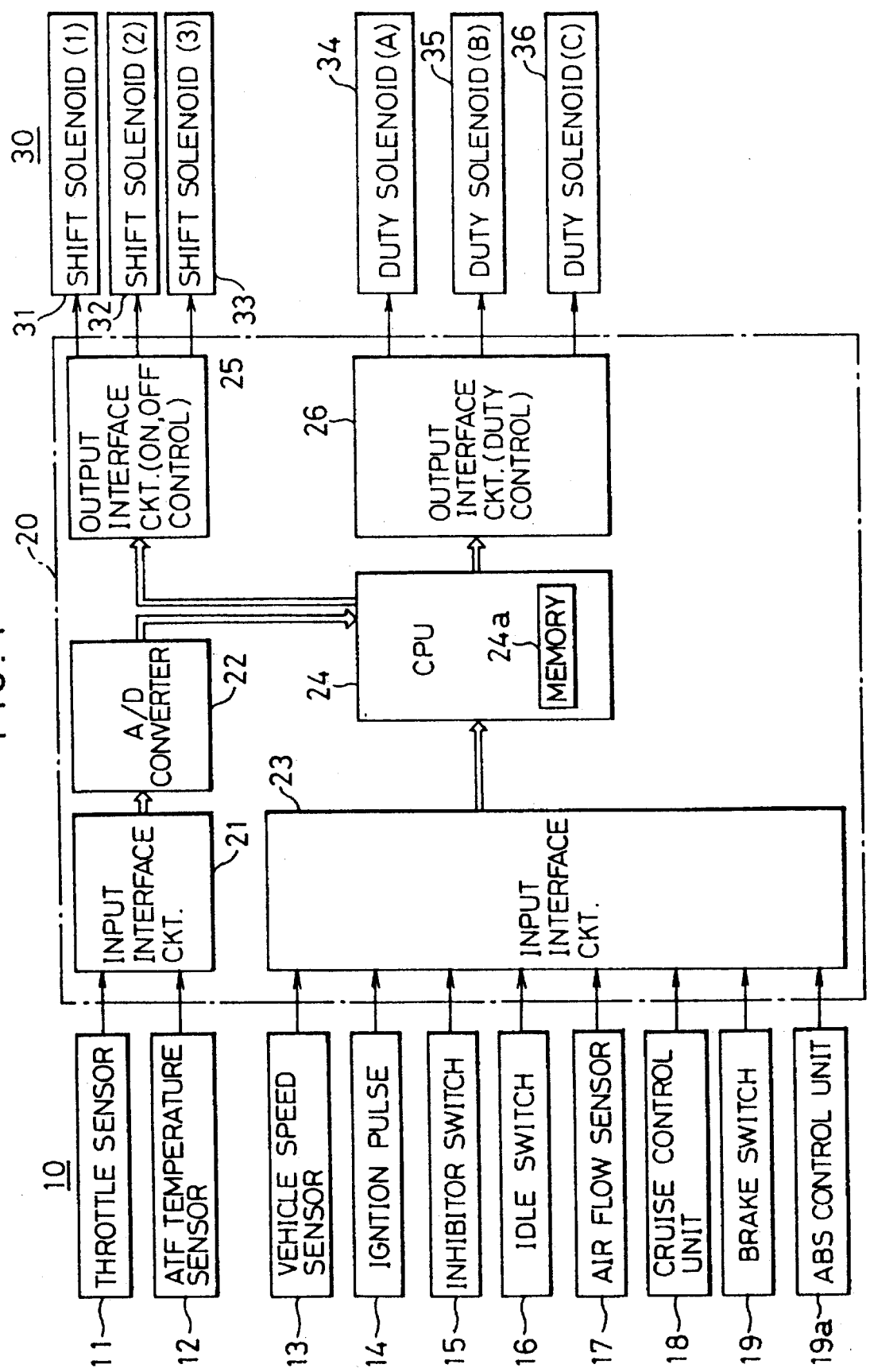
Fig. 1 is a block diagram showing a failure detecting system for an automatic transmission of a vehicle employing an engine rotational speed according to an embodiment of the present invention.

FIG. 1 shows a control system according to an embodiment of a failure detecting system for an automatic transmission of a vehicle of the present invention. The control system employs an engine rotational speed as one of input signals to control the automatic transmission. A failure is detected on the engine rotational speed when conditions to be described later are satisfied. When the failure is detected, a transmission control based on the engine rotational speed is prohibited, and a state before the failure is detected is maintained. The controls based on the engine rotational speed includes, for example, a gear shift control, a lockup control, and a line pressure control.

A throttle opening detection signal from a throttle sensor 11 and an ATF oil temperature detection signal from an ATF temperature sensor 12 are input to an input interface circuit 21 of an electronic control unit (ECU) 20 of the control system. The throttle opening detection signal from the throttle sensor 11 is used to determine a gear shifting point, a line pressure in a control circuit of the automatic transmission and a lockup vehicle speed for the lockup. The ATF oil temperature detection signal from the ATF temperature sensor 12 is used to prohibit lockup at the time of a low temperature and to release a fourth gear.

Various detection signals input through the input interface circuit 21 are converted to digital signals through an A/D converter 22, and then fed to a CPU 24. A program for executing a predetermined calculation of the CPU 24 is stored in a memory 24a *associated with the CPU 24.*

A vehicle speed detection signal from a vehicle speed sensor 13, an engine rotational speed detection signal from an ignition pulse generator 14, a shift range signal from an inhibitor switch 14, and a throttle full close state detection signal from an idle switch 16, an ABS signal from an ABS control unit 19a, a cruise control signal from a cruise control unit, and a brake switch signal from a brake switch 19 are input to an input interface circuit 23. The vehicle speed detection signal from the vehicle speed sensor 13 is used to control a gear shifting, lockup, line pressure and transfer. The engine rotational speed detection signal from the ignition pulse generator 14 is used to smoothly control the lockup operation and to prevent overrunning of an engine in a "1", "2" or "3" range. The shift range signal from the inhibitor switch 15 is used to determine the line pressure. The throttle full close state detection signal from the idle switch 16 is used to release a lockup clutch and to control the line pressure.

An output of the CPU 24 is applied to an output interface circuit 25 for controlling ON/OFF of shift solenoids (1)31, (2)32, (3)33 and an output interface circuit 26 for controlling duty ratios of duty solenoids (A)34, (B)35 and (C)36.

The shift solenoids (1)31, (2)32 control gear shifting, especially, its timing, thereby reducing a gear shifting shock. The shift solenoid (3)33 controls an overrunning clutch and a timing of shifting from a third gear to a second gear. The timing control reduces a shock at the time of shifting down the speed, and the overrunning clutch is operated at the time of decelerating, thereby effecting an engine brake.

The duty solenoid (A)24 regulates the line pressure to an optimum pressure responsive to a driving state. The duty solenoid (B)35 smoothly engages or disengages the lockup clutch. The duty solenoid (C)36 regulates a hydraulic oil pressure of a transfer clutch to control the rear wheel drive force.

The operation of the automatic transmission control system described above will be explained by referring to FIG. 2.

Figure 2:
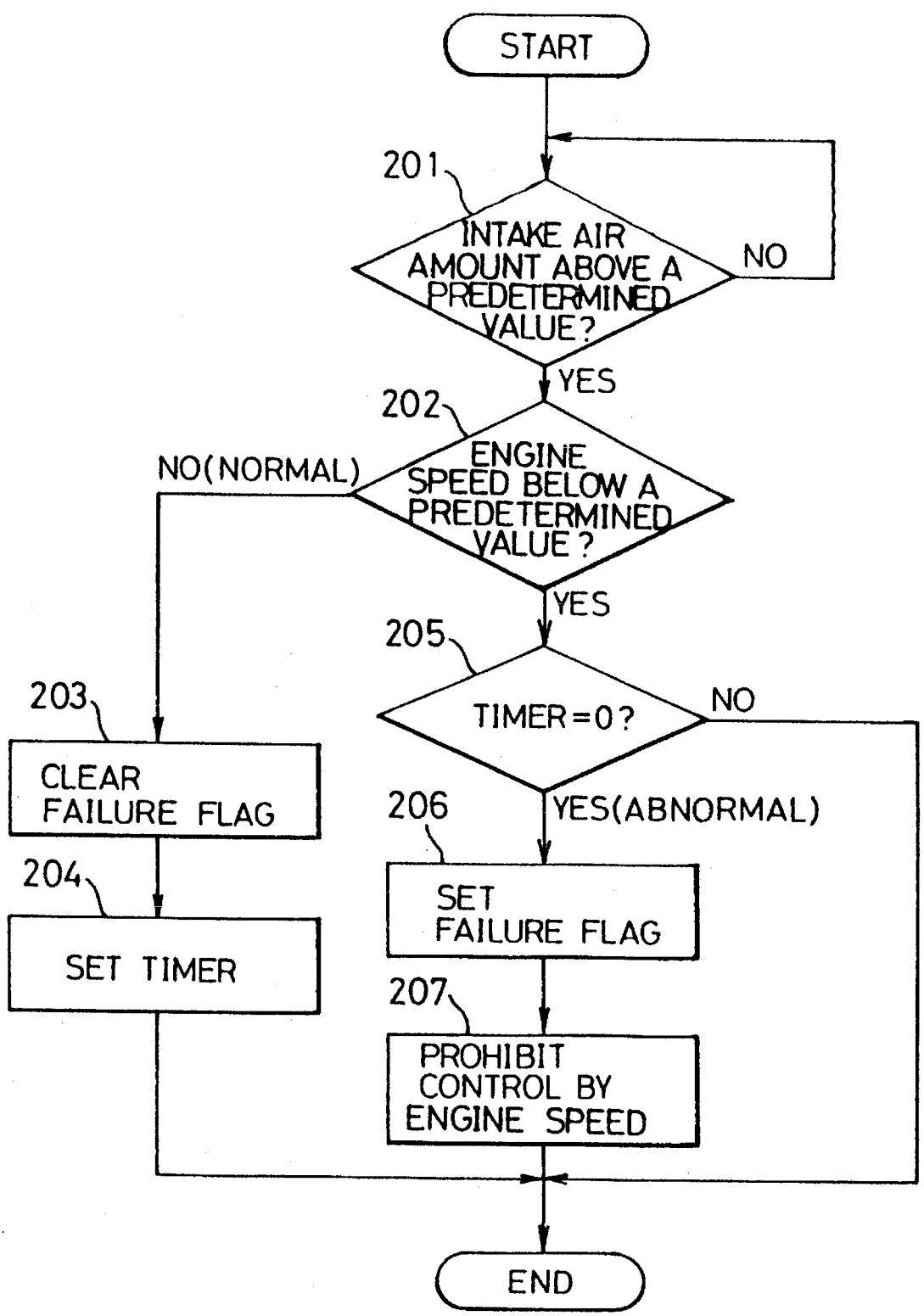
Fig. 2 is a flow chart for explaining an example of the operation of a failure detecting system for an engine rotational speed line according to FIG. 1.

FIG. 2 shows a flow in case that an amount of engine intake air is used to detect a failure of the engine rotational speed detection signal. When an air amount detection signal from an air flow sensor 17 is input to the CPU 24 of the ECU 20, whether or not an amount of intake air is larger than a predetermined value is Judged (in a step 201). When it is Judged that the amount of induction air is larger than a predetermined value, whether or not an engine rotational speed based on the engine rotational detection signal from the ignition pulse generator 14 is smaller than a predetermined value is Judged (in a step 202). If it is Judged that the engine speed is not smaller than a predetermined value, it is normal. A failure flag set, for example, to a register (not shown) provided in the CPU 24 is cleared, and a timer (not shown) in the CPU 24 is set to a predetermined time (in steps 203 and 204).

Moreover, when it is Judged that the engine rotational speed is smaller than the predetermined value (in the step 202) and a state that the engine rotational speed is smaller than the predetermined value continues for more than the predetermined time is further Judged (in a step 205), a failure flag is set to the register (not shown) (in a step 206). Thus, the failure flag is set to prohibit an automatic transmission control based on the engine rotational speed (in a step 207), and it is controlled to maintain the previous state before the engine rotational signal failure is judged.

On the contrary, if the state that the engine rotational speed is smaller than the predetermined value continues for more than the predetermined time is not judged (in the step 205), a failure is not detected, and the automatic transmission based on the engine rotational speed is continued.

Figure 4:
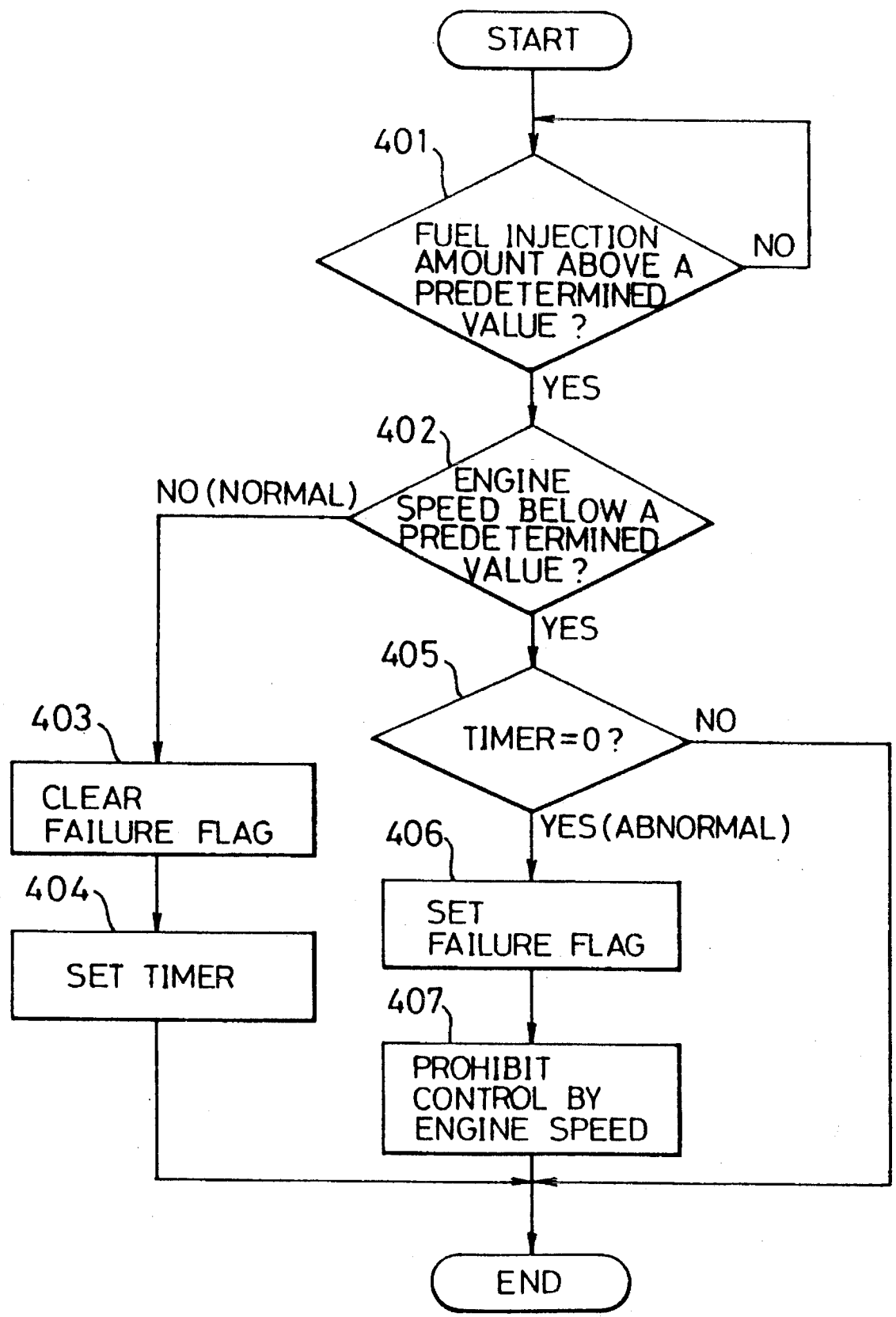
FIG. 4 is a flowchart for explaining an example of the operation of a failure detecting system for an engine rotational speed line according to FIG. 1.

FIG. 4 shows a flow in case where the amount of intake air of a decision condition is replaced with a fuel injection amount. First, whether or not the fuel injection amount is larger than a predetermined value is Judged (in a step 401). When the predetermined value of the fuel injection amount is calculated based on the intake air amount detection signal from the air flow sensor 17, and compared with an actual injection pulse width to the injection, thereby judging the fuel injection amount.

In case where it is judged that the fuel injection amount is larger than the predetermined value, it is Judged that the engine rotational speed indicated by the engine rotational detection signal from the ignition pulse 14 is smaller than a predetermined value (in a step 402). If it is Judged that the engine rotational speed is not smaller than the predetermined value, it is normal, a failure flag set, for example, to a register (not shown) provided in the CPU 24 is cleared and a timer (not shown) in the CPU 24 is set to a predetermined time (in steps 403 and 404).

Moreover, when it is Judged that the engine rotational speed is smaller than the predetermined value (in the step 402) and a state that the engine rotational speed is smaller than the predetermined value for more than a predetermined time (in a step 405), a failure flat is set to the register (not shown) (in a step 406). Thus, the failure flag is set to prohibit the automatic transmission control based on the engine rotational speed (in a step 407), and the state before the engine rotational speed failure is detected is maintained to be controlled.

On the contrary, in case where the state that the engine rotational speed is smaller than a predetermined value is not continued for the predetermined time (in the step 405), it is not decided to be failure, and the automatic transmission control based on the engine rotational speed is continued.

Figure 3:
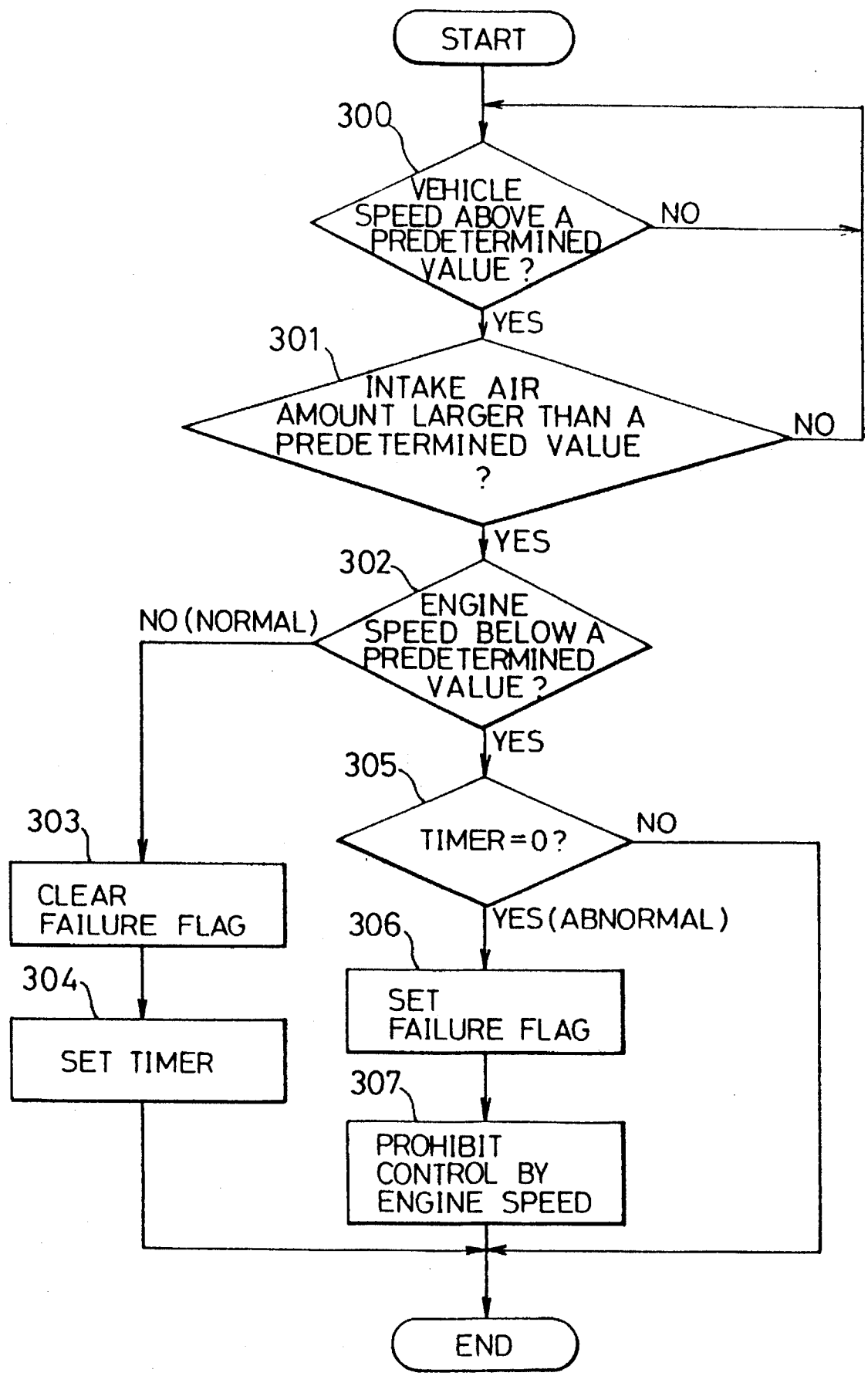
Fig. 3 is a flow chart for explaining an example of the operation of a failure detecting system for an engine rotational speed line according to FIG. 1.
Figure 5:
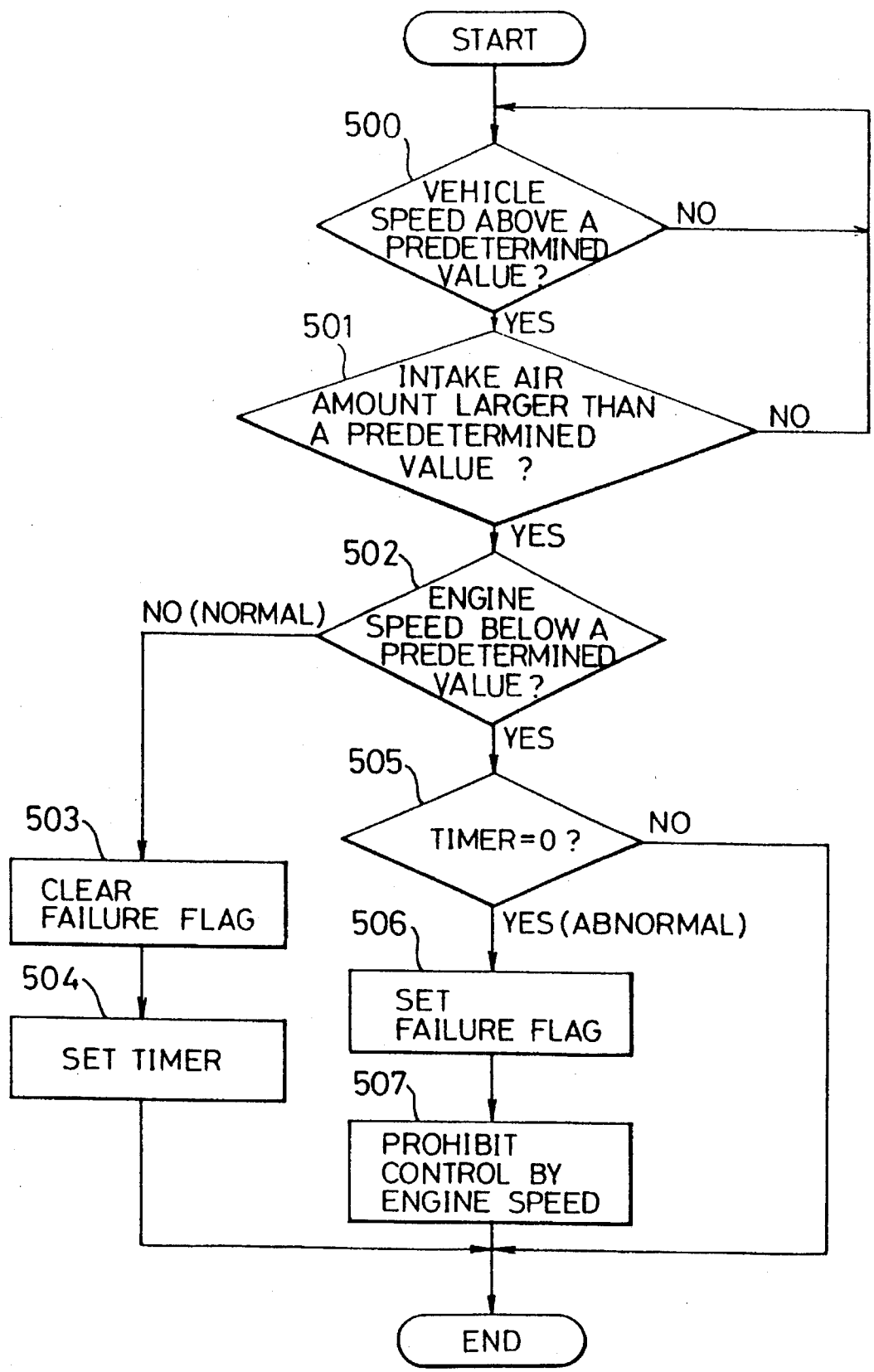
Fig. 5 is a flow chart for explaining an example of the operation of a failure detecting system for an engine rotational speed line according to FIG. 1.

In the embodiment described above, the case where the amount of intake air and the fuel injection amount are larger than predetermined values is employed as one factor of the decision condition. However, the present invention is not limited to the particular embodiment. For example, as shown in FIGS. 3 and 5, a vehicle speed detected by the vehicle speed sensor 13 may be added to the decision condition.

More specifically, summary of flows of the case where the above-described factors are employed as decision conditions is as follows.
(1) When the amount of engine intake air is larger than a predetermined value, the state that the engine rotational speed is smaller than a predetermined value is continued for a predetermined time.
(2) When the vehicle speed is larger than a predetermined value, the amount of intake air is larger than a predetermined value and the state that the engine rotational speed is smaller than a predetermined state is continued for a predetermined time.
(3) When the fuel injection amount is larger than a predetermined value, the state that the engine rotational speed is smaller than a predetermined value is continued for a predetermined time.
(4) When the vehicle speed is larger than a predetermined value, the fuel injection amount is larger than a predetermined value and the state that the engine rotational speed is smaller than a predetermined value is continued for a predetermined time.

In case where any of the above conditions (1) to (4) is satisfied, it is determined that a failure occurs on the engine rotational speed signal, the automatic transmission control based on the engine rotational speed is prohibited, and the state before the failure of the engine rotational speed signal is detected is maintained.

In the embodiment described above, in case where the amount of intake air or the fuel injection amount is larger than predetermined value, when the engine rotational speed detection signal from the ignition pulse generator 14 is not suitably detected, a failure is determined, and the automatic transmission control is executed in the state before the failure is determined. Therefore, since the failure of the engine rotational speed signal can be reliably detected, the automatic transmission control based on the engine rotational speed such as, for example, a speed shift control, a lockup control, a line pressure control can be appropriately controlled.

Another embodiment of the present invention will be explained in detail with reference to FIGS. 6 to 9.

Referring back to FIG. 1, showing a control system including a failure detecting system for a cruise control set signal line connected to an automatic transmission of a vehicle. The control system employs a cruise control signal from a cruise control unit as one of input signals to control the automatic transmission. A failure on the cruise control set signal line is determined when conditions to be described later are satisfied. When the failure is detected, a transmission control based on a cruise control signal is prohibited. However, a normal state is recovered when an OFF signal of the cruise control is detected in the conditions to be described later.

As the automatic transmission control in case where the cruise control signal from the cruise control unit is employed, there are a gear shifting control (control at the time of cruise control), a lockup control (ordinarily a lockup control), an overrunning clutch control (namely, engine brake control), etc.

The operation of the failure detecting system for the cruise control set signal line connected to the automatic transmission control system described above will be explained by referring to FIGS. 6 to 9.

Figure 6:
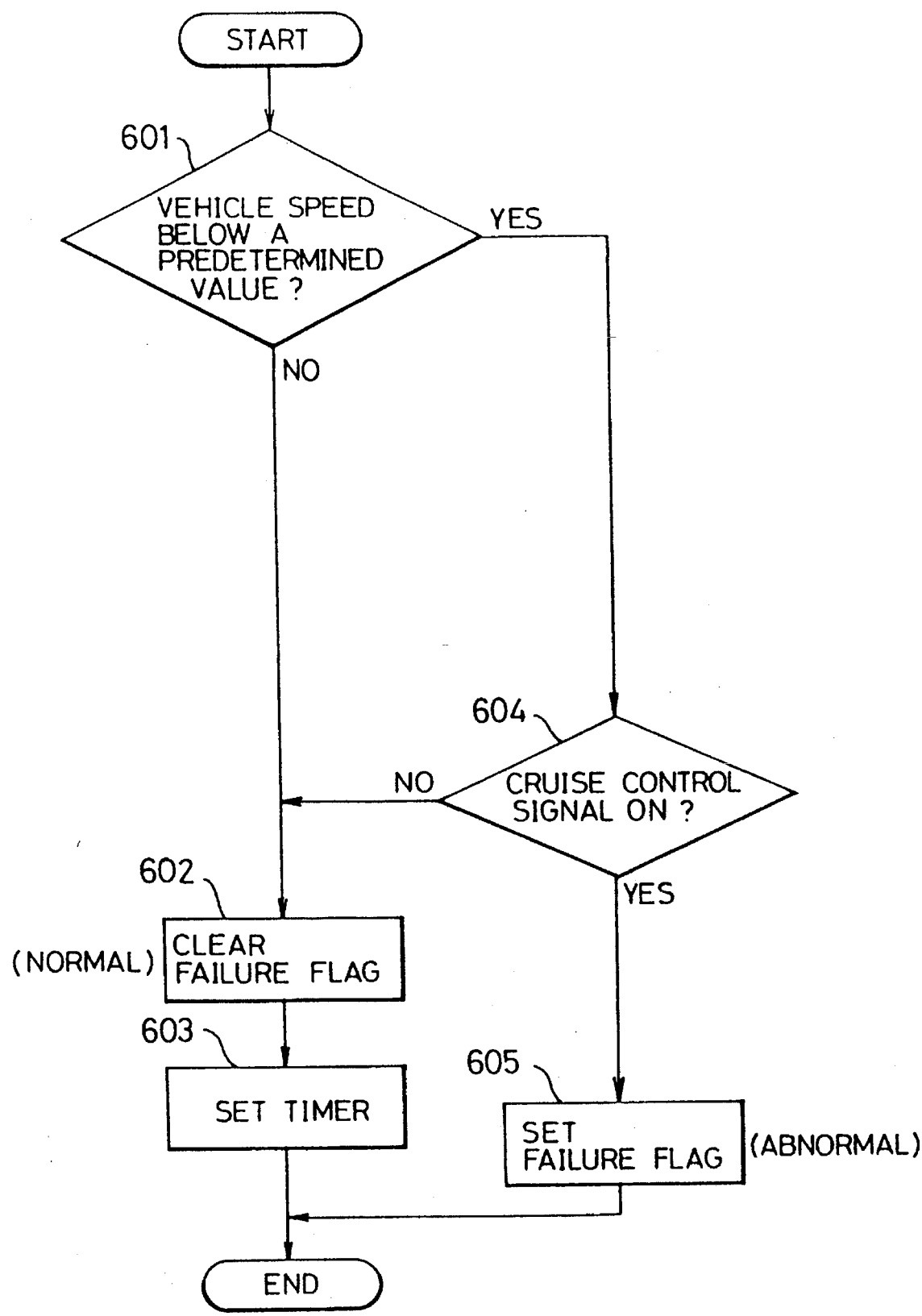
Fig.6 is a flow chart for explaining an example of the operation of a failure detection system for a cruise control signal line according to FIG. 1.

FIG. 6 shows a flow to determine a case where a cruise control signal is erroneously turned on at a vehicle speed or less when the cruise control is not operated. When a detection signal from the vehicle speed sensor 13 is input to the CPU 24 through an input interface circuit 23, whether or not it is smaller than a predetermined value is judged (in a step 601). In case where it is Judged that the detection signal is not smaller than the predetermined value, a failure flag of the cruise control signal is cleared, and a timer is set to a predetermined time (in steps 602 and 603).

On the contrary, in case where it is Judged that the detection signal is smaller than the predetermined value, whether or not the cruise control signal is input is Judged (in a step 604). In case where it is Judged that the cruise control signal is input, a failure flag of the cruise control signal is set thereby to decide a failure (in a step 605).

Figure 7:
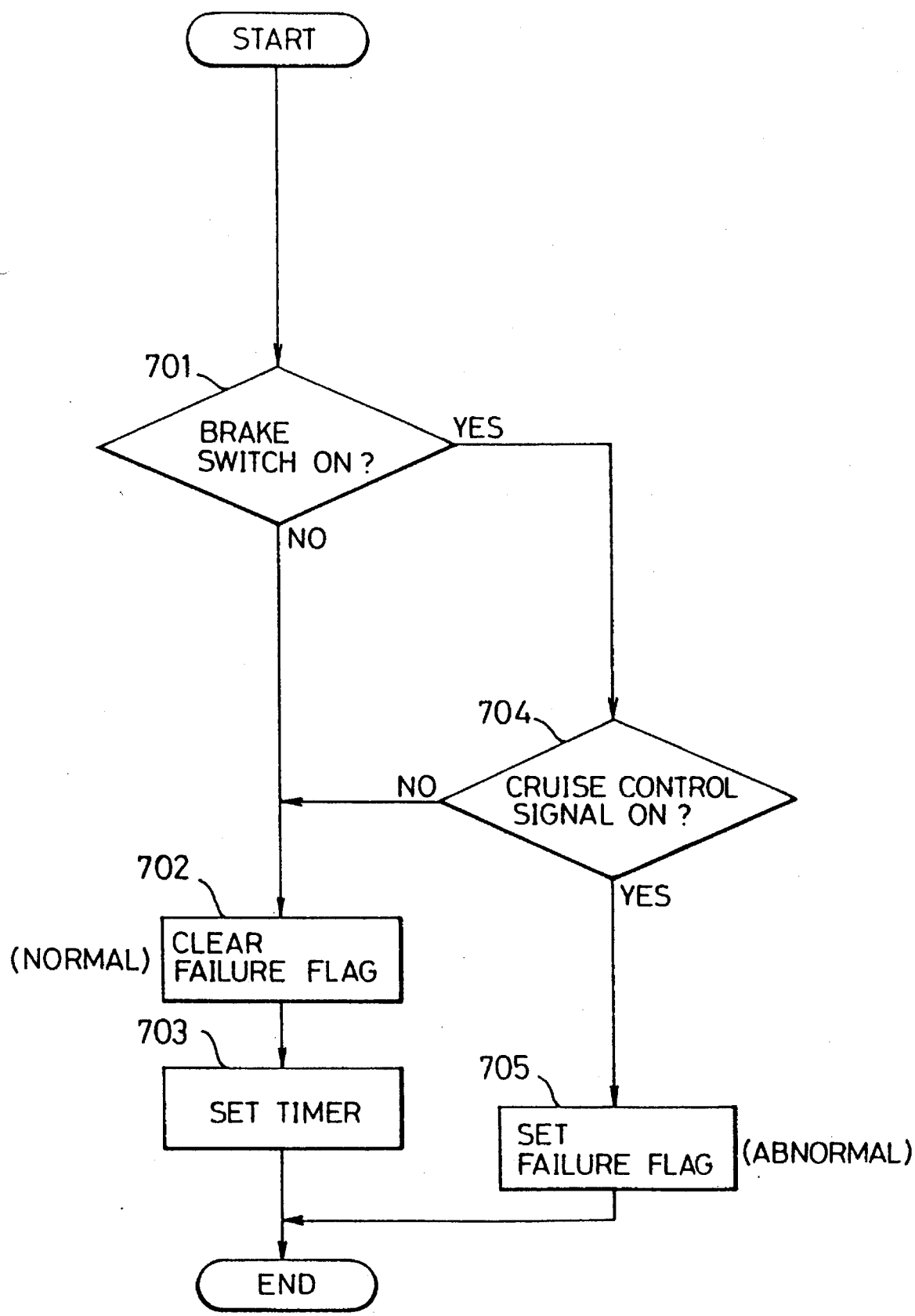
Fig.7 is a flow chart for explaining an example of the operation of a failure detection system for a cruise control signal line according to FIG. 1.

FIG. 7 shows a flow to determine a case where a cruise control signal which ought to be released when a brake switch is turned on is erroneously turned on. Whether or not the brake switch 19 is turned on is Judged (in a step 701). In case where a brake ON signal from the brake switch 19 is not input, a failure flag of the cruise control signal is cleared, and a timer is set to a predetermined time (steps 702 and 703).

Moreover, in case where the brake ON signal from the brake switch 19 is input, it is Judged whether or not the cruise control signal is input is Judged (in a step 704), while when it is judged that the cruise control signal is input, a failure flag of the cruise control signal is set to decide a failure (in a step 705).

Figure 8:
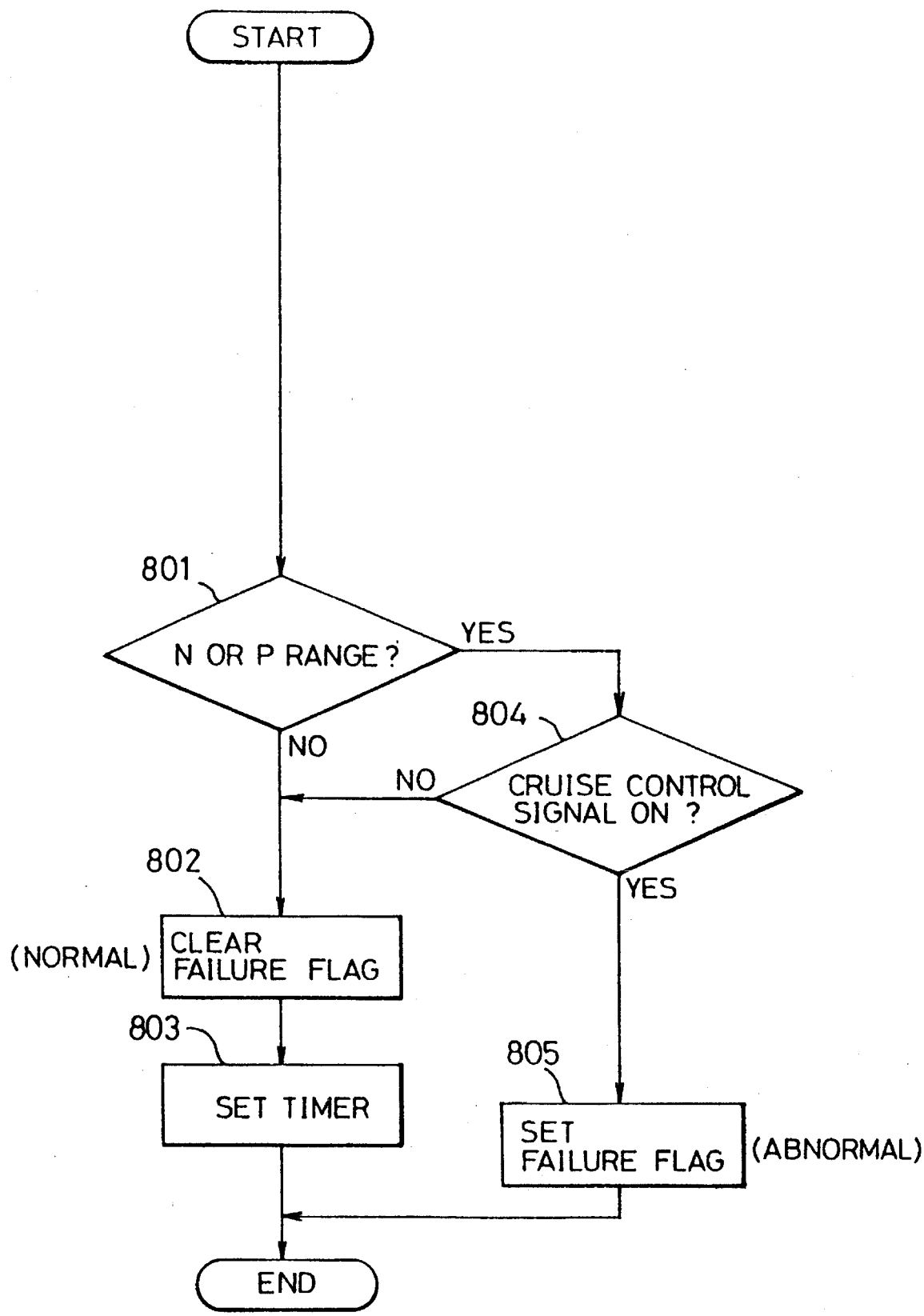
FIG. 8 is a flowchart for explaining an example of the operation of a failure detection system for a cruise control signal line according to FIG. 1.

FIG. 8 shows a flow to determined a case where a cruise control signal is erroneously turned on in an "N" or "P" range. A neutral range (N) or a parking range "P" is judged based on a shift range signal from the inhibitor switch 15 (in a step 801). As a result of the judgment, in case it is judged that the shift range signal does not indicate the neutral range (N) nor the parking range (P), a failure flag of the cruise control signal is cleared, and a timer is set to a predetermined time (in steps 802 and 803).

On the contrary, in case where the neutral range (N) or the parking range (P) is detected in the step 801, whether the cruise control signal is input or not is Judged (in a step 804). In case where the cruise control signal is input, a failure flag of the cruise control signal is set to judge the failure (in a step 805).

Figure 9:
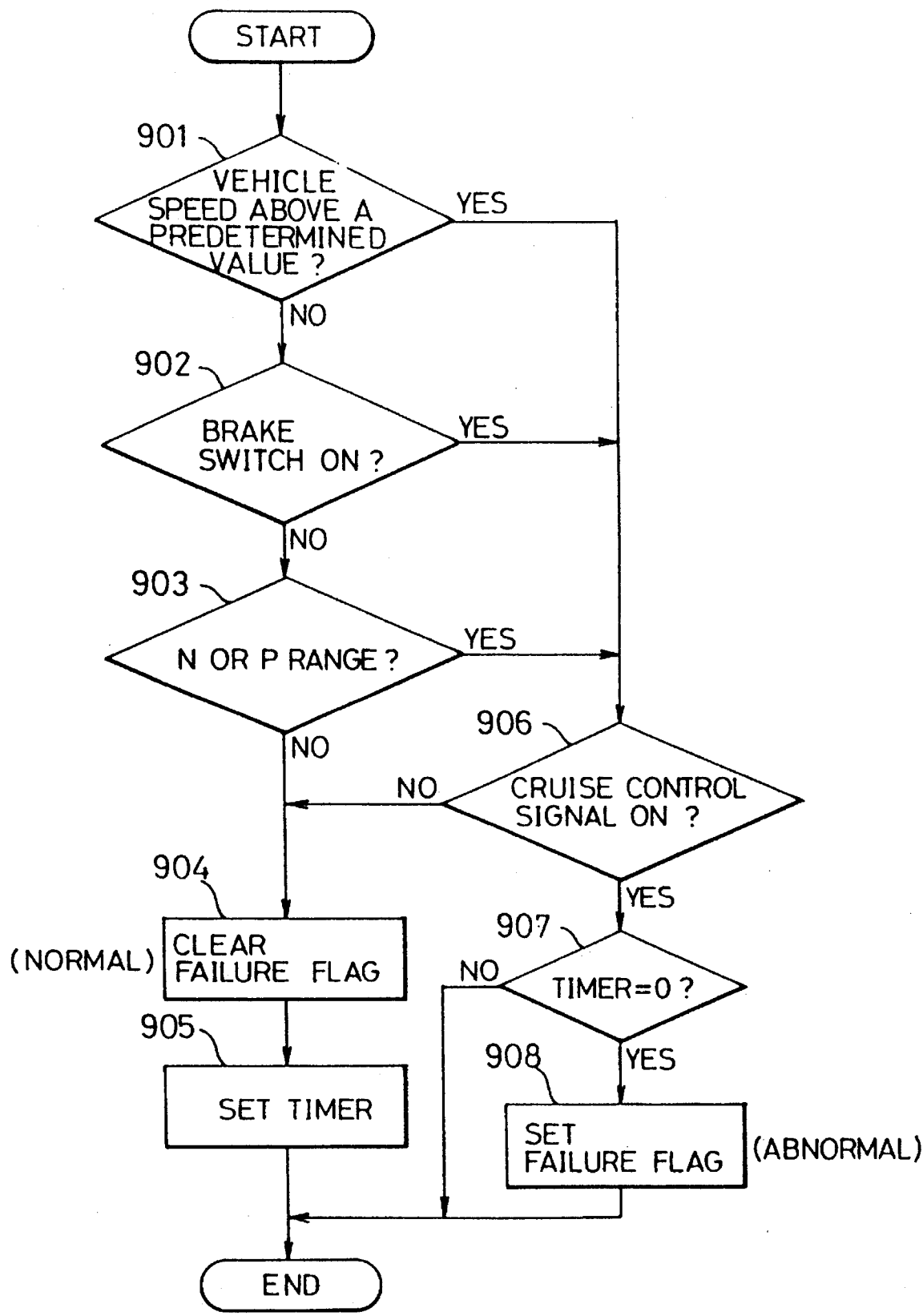
FIG. 9 is a flow chart for explaining an example of the operation of a failure detection system for a cruise control signal line according to FIG. 1.

FIG. 9 shows a flow to determine a case where any of when the cruise control signal is erroneously turned on at a vehicle speed or less in the case of cruise control non-operation, when the cruise control signal which ought to be released at the time of turning the brake switch on is erroneously turned on, and when the cruise control signal is erroneously turned on in an "N" or "P" range is continued for a predetermined time. First, when a detection signal from the vehicle speed sensor 13 is input to the CPU 24 through the input interface circuit 23, it is judged that the detection signal is smaller than a predetermined value or not (in the step 901). In case where the signal is judged not to be smaller than the predetermined value, whether or not the brake switch 19 is turned on is judge (in the step 902). In case where a brake ON signal from the brake switch 19 is not input, the neutral range (N) or the parking range (P) is Judged based on a shift range signal from the inhibitor switch 15 (in the step 903).

As a result of the judgment, in case where the signal is judged not to be the neutral range "N" nor the parking range "P", a failure flag of the cruise control signal is cleared, and a timer is set to a predetermined time (in steps 904 and 905).

Moreover, when the vehicle speed is not smaller than the predetermined value (in the step 901), when the brake ON signal is detected (in the step 902), or further when either of the neutral range (N) and the parking range (P) is detected (in the step 903), whether or not the cruise control signal is input is judged (in a step 906). If the cruise control signal is not input, the flow is advanced to the step 904, and the failure flag is cleared. However, in case where the cruise control signal is not input, whether the timer becomes "zero" or not is Judged (in a step 907). That is, the "zero" of the timer means that the predetermined time is elapsed. In case where the timer becomes "zero", the failure flag of the cruise control signal is set to decide the failure (in a step 908).

Summary of the conditions for detecting the failure of the cruise control set signal line is as follows.
(1) When the cruise control is not operated, the cruise control signal is erroneously turned on in case where a vehicle speed is smaller than a predetermined value.
(2) When a brake switch is turned on, the cruise control signal which ought to be released is erroneously turned
(3) When an "N" or "P" range, the cruise control signal is erroneously turned on.
(4) Any of the conditions (1) to (3) is continued for a predetermined time.

In case where any of the above conditions (1) to (4) is satisfied, a failure on the cruise control set signal line is detected, the automatic transmission control based on the cruise control signal is prohibited.

In the embodiment described above, a normal state is recovered when an OFF signal of the cruise control is detected after one of the above-described conditions is satisfied.

Accordingly, since a failure of the cruise control set signal line is reliably detected, the automatic transmission control using the cruise control signal is appropriately executed.

Still another embodiment of the present invention will be explained in detail with reference to FIGS. 10 to 14.

Referring back to FIG. 1, showing a control system including a failure detecting system for a brake switch connected to an automatic transmission of a vehicle is shown. The control system employs a brake signal from the brake switch as one of the input signals used to control the automatic transmission. A failure of the brake switch is detected when conditions to be described later are satisfied. When the failure is detected, a transmission control based on the brake signal is prohibited. However, a normal state is recovered when an OFF signal of the cruise control is detected after one of the conditions to be described later is satisfied. Control for a four-wheel drive transfer clutch in the automatic transmission (control at the time of operating ABS) is performed in response to the brake signal.

The operation of the failure detecting system for the brake switch connected to the automatic transmission control system described above will be explained by referring to FIGS. 10 – 12.

Figure 10:
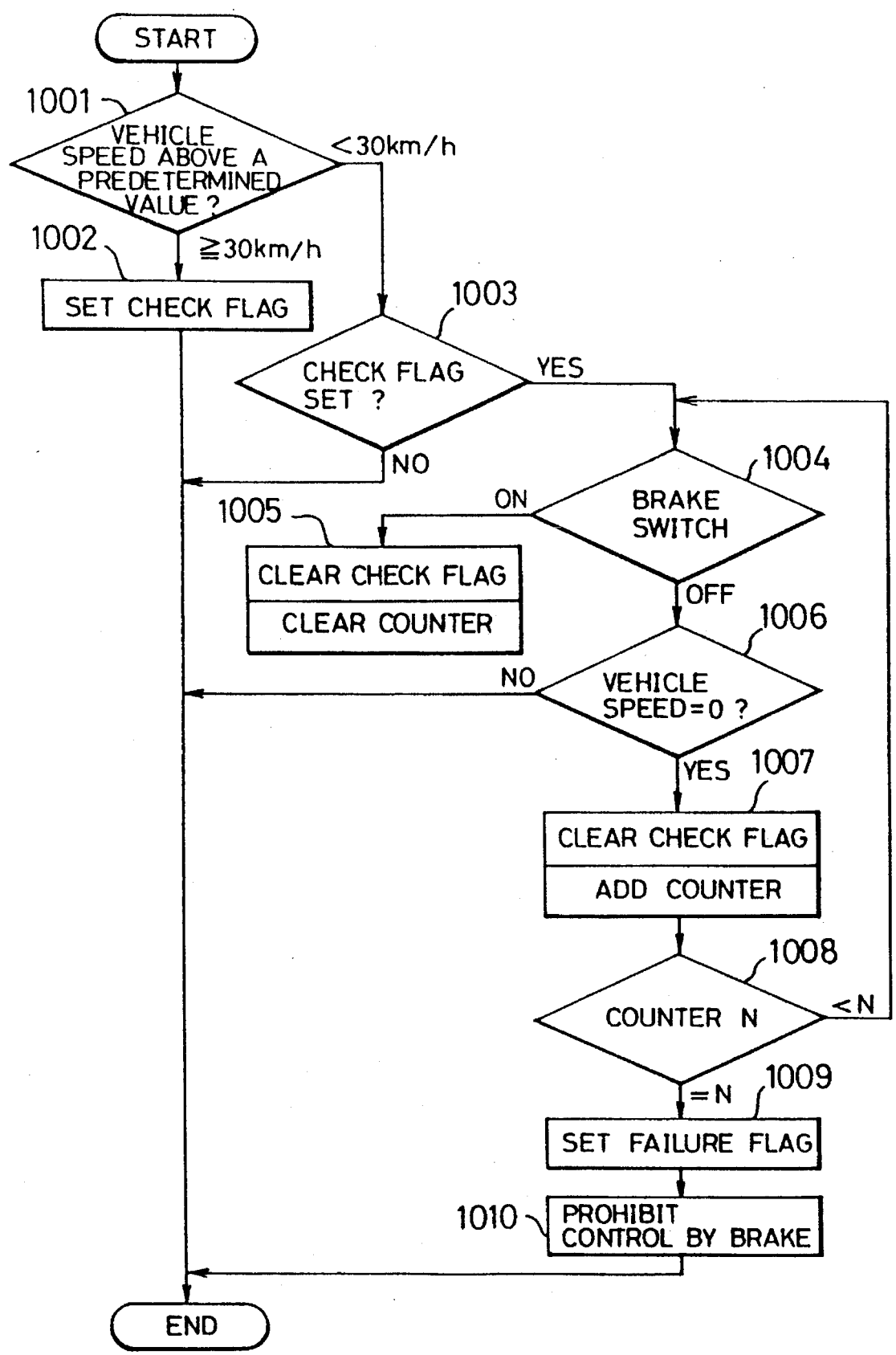
FIG. 10 is a flow chart for explaining an example of the operation of the failure detecting system for a brake switch according to FIG. 1.

FIG. 10 is a flow chart illustrated a case where a brake on signal is not detected when the vehicle speed is decelerated until a vehicle is stopped, and when this phenomenon is continuously repeated predetermined times.

More specifically, when a detection signal from the vehicle speed sensor 13 is input to the CPU 24 through an input interface circuit 23, the vehicle speed is Judged (in a step 1001). When the vehicle speed is, for example, faster than 30 km/hr, a check flag is set (in a step 1002).

On the contrary, in case where the vehicle speed is slower than 30km/hr, presence/absence of the check flag is judged (in a step 1003). If the check flag is not set, the check flag is reset. In case where the check flag is set, ON/OFF of the brake switch 19 is judged (in a step 1004). If the brake switch 19 is Judged to be turned on, the check flag is cleared, and a counter is also cleared (in a step 1005).

In case where the brake switch 19 is turned off, whether or not the vehicle speed becomes "zero" is Judged (in a step 1006). If it is Judged that the vehicle speed becomes "zero", the check flag is cleared, and a counter is counted up (in a step 1007). In the case where a counted-up value reaches a predetermined value N by repeating the count-up of the counter (in a step 1008), an error flag is set, and the automatic transmission at the time of braking is prohibited (in steps 1009 and 1010).

Figure 11:
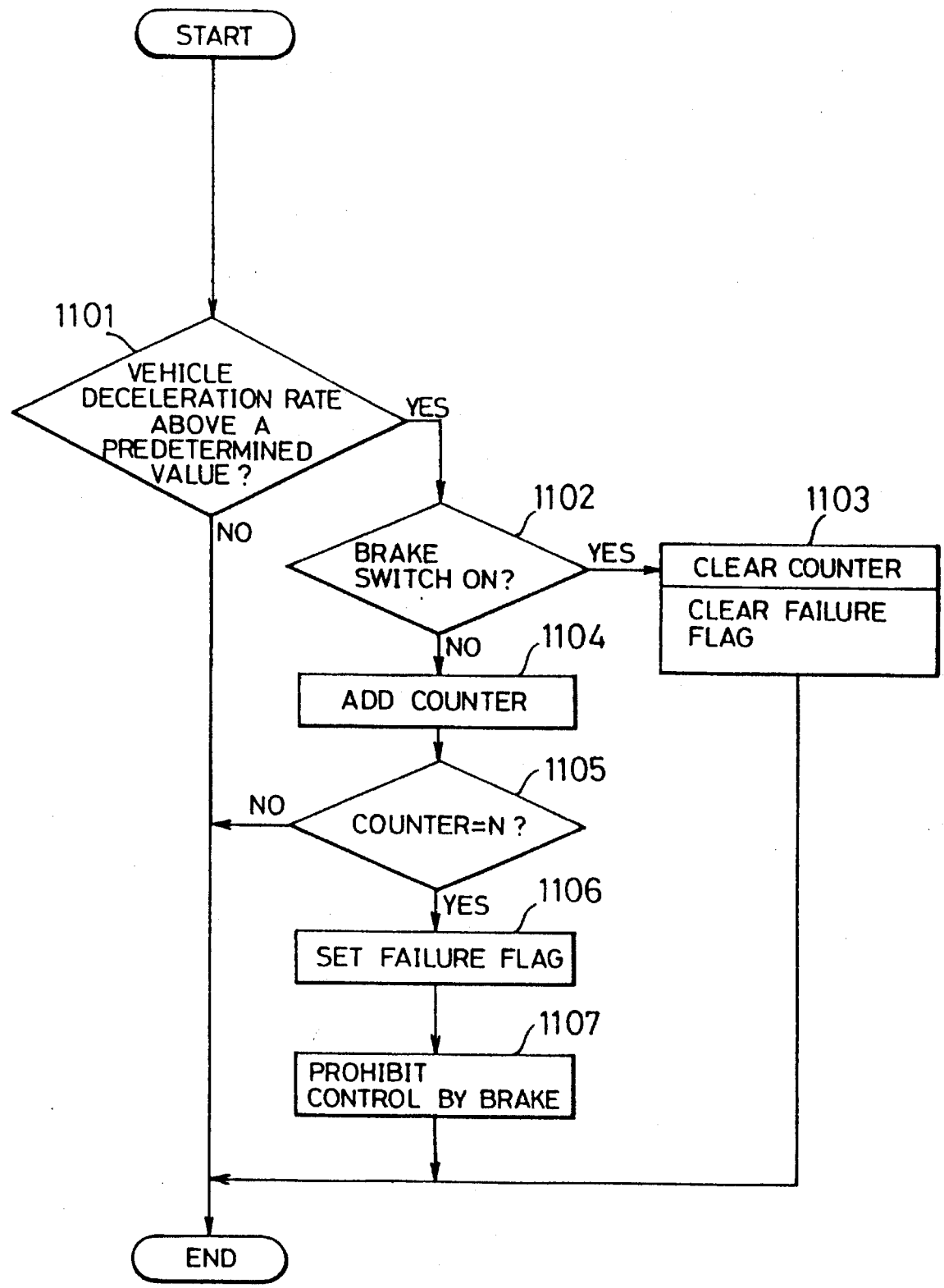
Fig. 11 is a flow chart for explaining an example of the operation of the failure detecting system for a brake switch according to FIG. 1.

FIG. 11 is a flow to determine a case where the brake ON signal is not detected when a deceleration of the vehicle is larger than a predetermined value, and when this phenomena occurs continuously predetermined times.

More specifically, whether the deceleration of the vehicle is larger than the predetermined value or not is judged (in a step 1101). In case where it is Judged that the deceleration is larger than the predetermined value, presence/absence of the brake ON signal is Judged (in a step 1102). If the brake ON signal is detected, a counter is cleared (in a step 1103).

In case where the brake ON signal is not detected, the counter is counted up in step 1104. When the counted-up value reaches a predetermined amount of times, an error flag is set, and the automatic transmission control at the time of the brake is prohibited (in steps 1105 to 1107).

Figure 12:
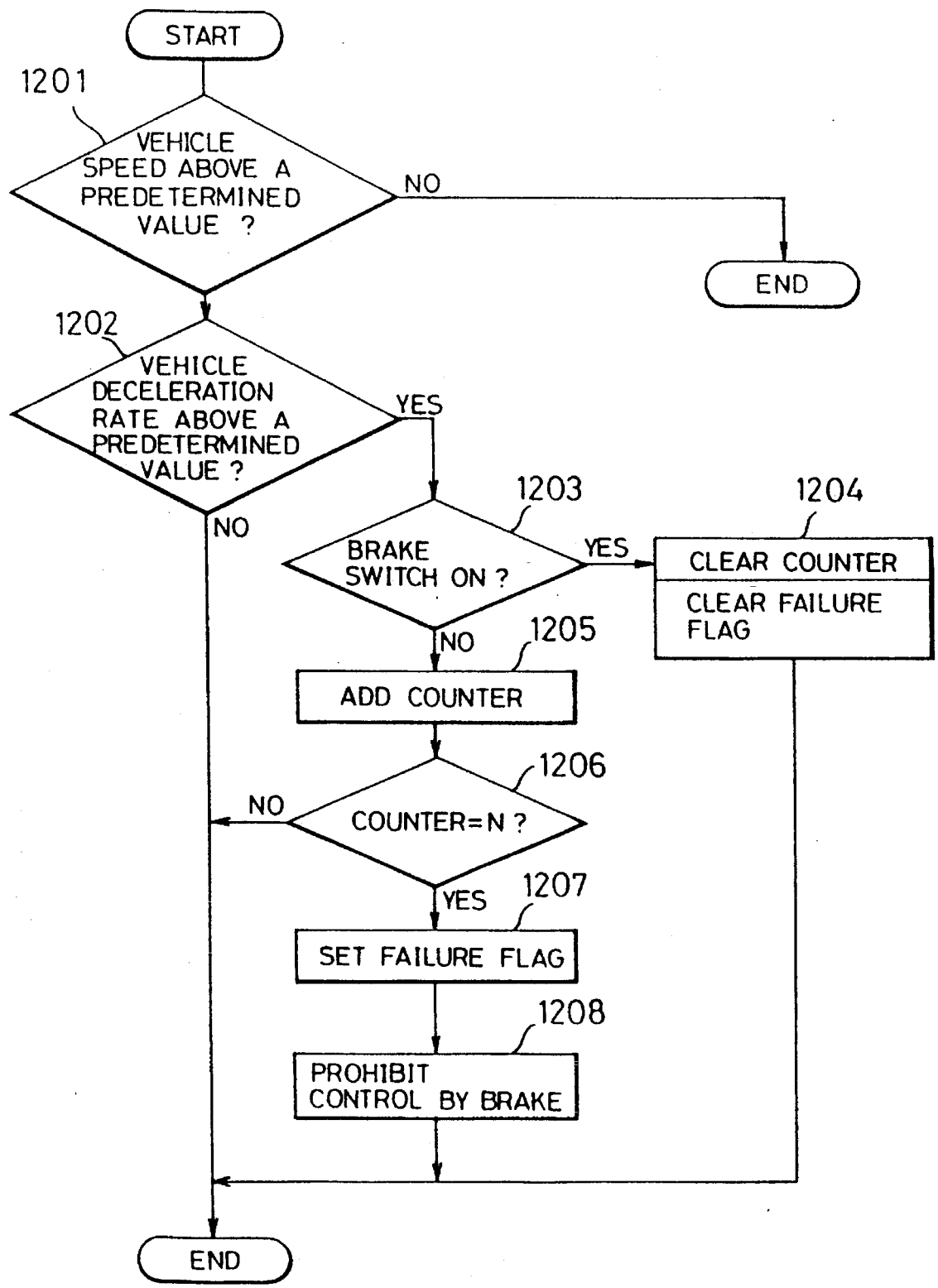
FIG. 12 is a flowchart for explaining an example of the operation of the failure detecting system for a brake switch according to FIG. 1.

FIG. 12 is a flow chart combining of the both two cases described above. Whether the vehicle speed is faster than a predetermined value or not is Judged prior to the decision of the deceleration as shown in FIG. 11 (in step and 1202).

Figure 13:
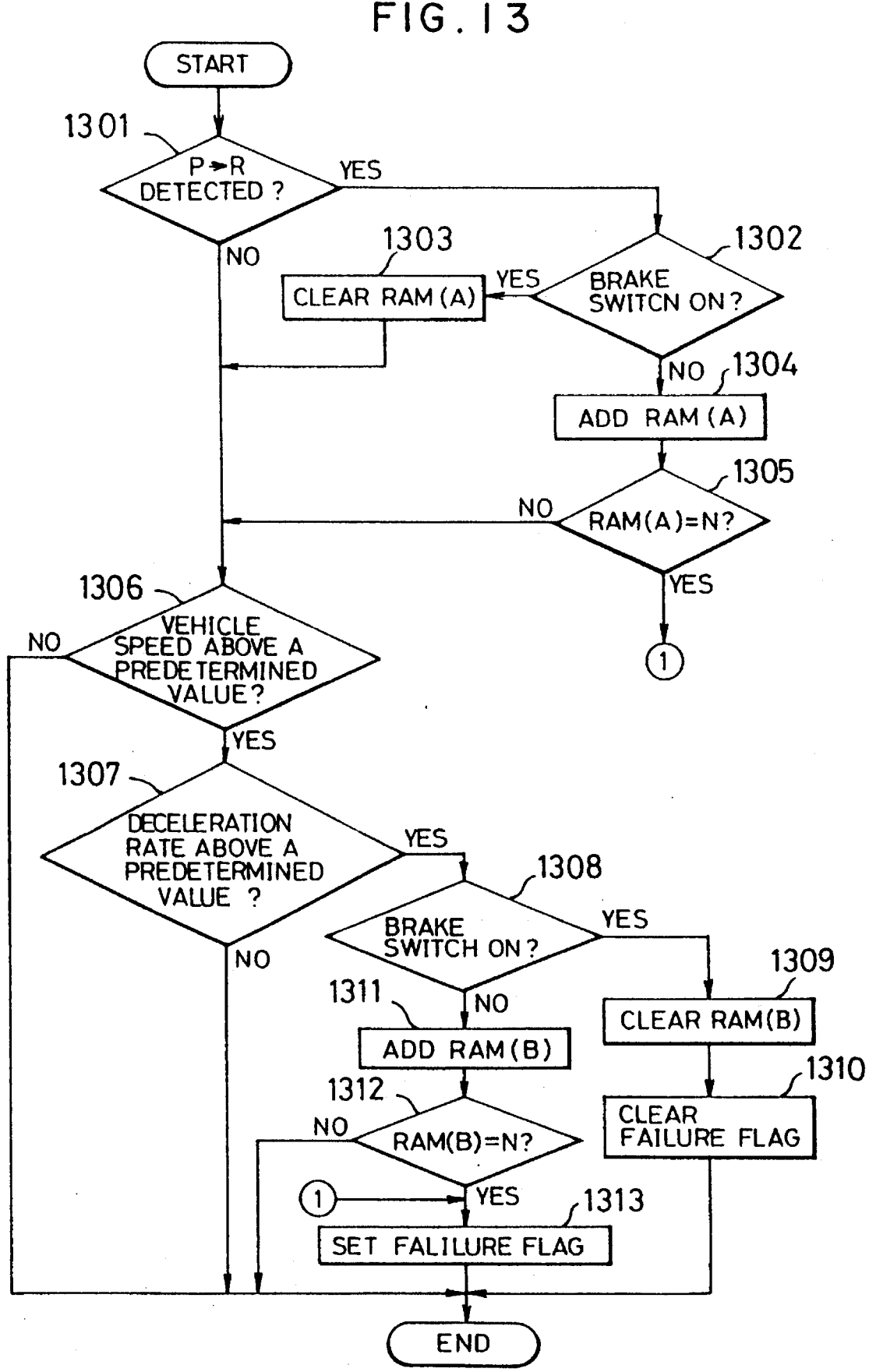
Fig. 13 is a flow chart for explaining an example of the operation of the failure detecting system for a brake switch according to FIG. 1.
Figure 14:
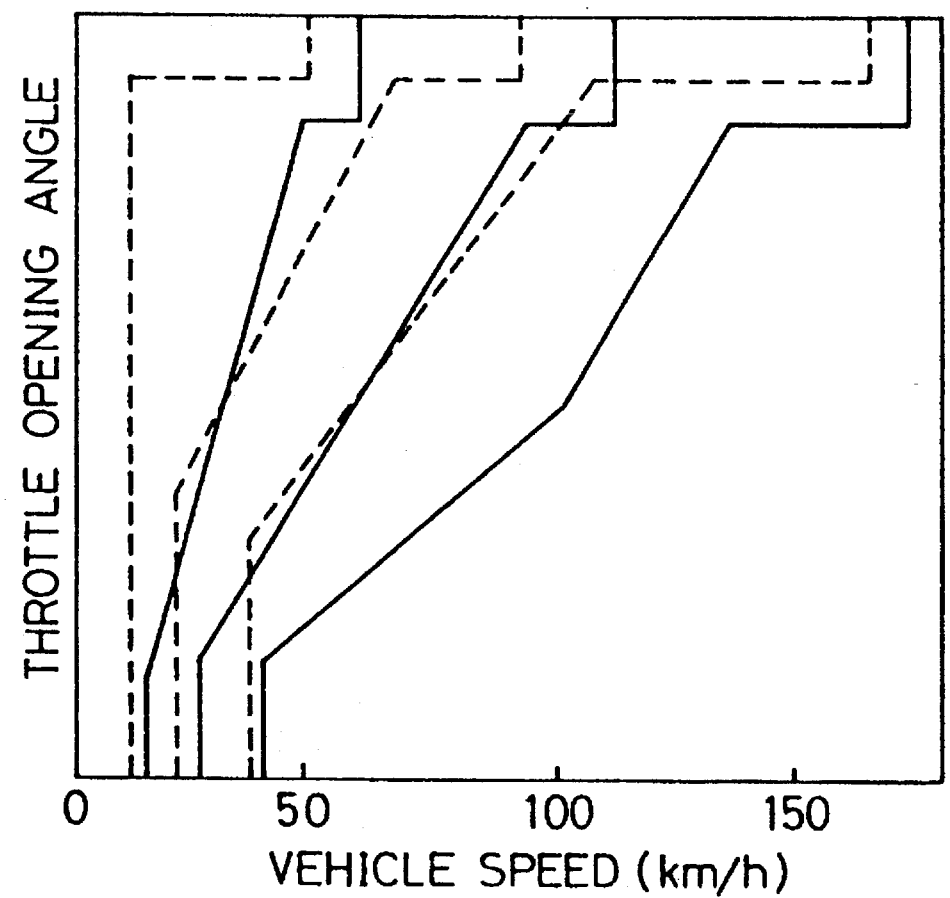
Fig. 14 is a view showing a shift schedule stored in a gear shift map for a conventional automatic transmission control.
Figure 15:
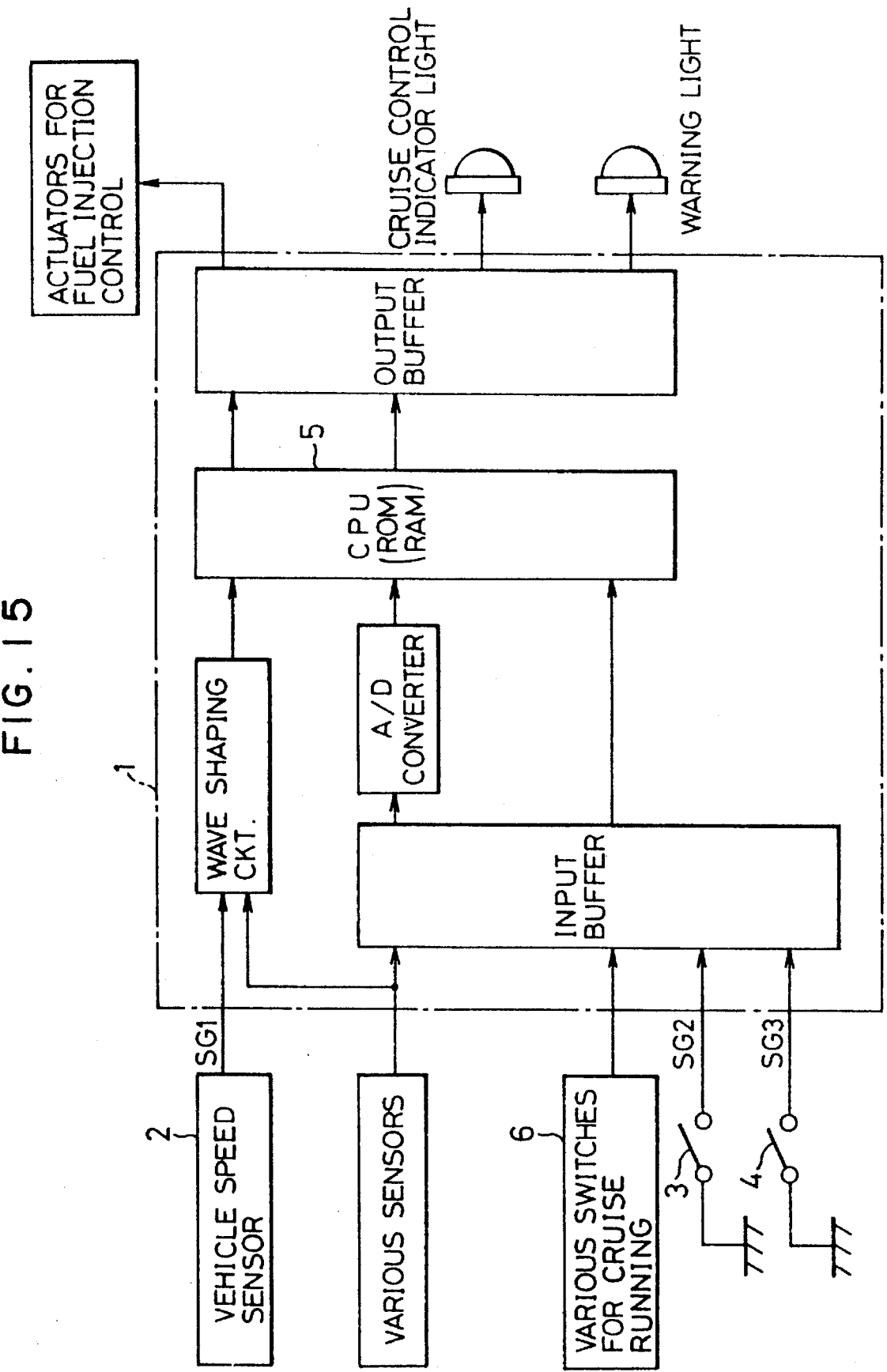
Fig. 15 is a view showing a conventional cruise controller.

FIG. 13 shows a flow to determine a case where absence of the brake ON signal is detected, a predetermined amount of times, when the P or R range is selected in the vehicle having a shift locking mechanism.

More specifically, when a shift range signal from the inhibitor switch 15 is input to the CPU 24 through the input interface circuit 23, a range position is judged (in step 1301). In the case where the range is altered from the P range to the R range, whether or not the brake switch 19 is turned on is judged (in a step 1302). That is, in this case, it is assumed that a shift locking mechanism between the P and R ranges is provided, which is released by manipulating a shift lever while depressing the brake pedal.

In the case where the brake ON signal is detected, stored information in a RAM(A) (not shown) of a memory 24a associated with the CPU 24 is cleared (in a step 2303). Moreover, in the case where the brake ON signal is not detected, the number of counts stored in RAM(A), indicating the number of detections of the brake ON signal is added (in a step 1304). When the added number in the RAM(A) reaches a predetermined value N, a brake failure flag is set, and hence an automatic transmission control in response to the brake switch is prohibited (in a step 1313).

Furthermore, in case where the added number in the RAM(A) (in a step 1305) does not reach the predetermined value N, the vehicle speed is judged (in a step 1306). That is, when a detection signal from the vehicle speed sensor 13 is input to the CPU 24 through an input interface circuit 23, a predetermined speed is compared with a detected speed from the vehicle speed sensor 13, and whether the detected speed is faster than the predetermined speed or not can be judged. In case where it is judged that the detected speed is larger than the predetermined speed, ON/OFF of the brake switch 19 is judged (in a step 1308). In a case where the brake ON signal is detected, stored information in a RAM(B) (not shown) of the memory 24a is cleared, and further, a brake failure flag is cleared (in steps 1309 and 1310).

On the contrary, in case where the brake ON signal is not detected, the number of counts stored in RAM(B) indicating the number of detections of the brake ON signal is added to the RAM(B) (in a step 1311). When the added number in the RAM(B) reaches a predetermined value N, the brake failure flag is set, and hence the automatic transmission control in response to the brake switch is prohibited (in a step 1313). More specifically, summary of the flow detecting a failure of the brake signal is as follows.

(1) When the vehicle speed is decelerated until a vehicle is stopped, a brake ON signal is not detected, and when this phenomenon occurs continuously predetermined times.
(2) When a deceleration of the vehicle is larger than a predetermined value, the brake ON signal is not detected, and when this phenomenon occurs continuously predetermined times.
(3) In case where the vehicle speed is larger than a certain value, and the condition (2) is satisfied,
(4) In a vehicle having a shift locking mechanism, when a R range is selected from a P range, absence of the brake ON signal continuously occurs predetermined times. In case where any of the above conditions (1) to (4) is satisfied, a failure of the brake signal is detected, the automatic transmission control using the brake signal is prohibited. However, a normal state is recovered when the brake signal is detected after one of the above-described conditions is satisfied. Therefore, since the check switch for instructing a check before the cruise control like prior art is eliminated, its structure is not only simplified, but also a failure of the brake switch in the various running states is reliably detected, and hence the automatic transmission control using the brake signal is appropriately executed.

Still another embodiment of the present invention will be explained in detail with reference to FIGS. 16 to 19.

Referring back to FIG. 1, showing a control system including a failure detecting system for a shift range (inhibitor) switch signal used for an automatic transmission control. The control system employs a shift range signal from an inhibitor switch as one of control signals to control the automatic transmission. A failure is detected when conditions of the range signal to be described later are satisfied. When the failure is detected, a transmission control based on the range signal is prohibited.

The operation of the failure detecting system for the shift range switch signal of the automatic transmission control system described above will be explained by referring to FIG. 16.

First, whether the vehicle speed V is higher than a predetermined value Vo or not is judged (in a step 1601). When the vehicle speed is higher than the predetermined value, the shift range signal from the inhibitor switch 15 is fetched to the CPU 24 through the input interface circuit 23 (in a step 1602).

Then, whether the shift range signal is input or not is judged (in a step 1603). In case where no input is judged, whether the range detected in previous routine is the "N" range or not is judged in next step (in a step 1604). In case where the "N" range is judged, i.e., when no shift range signal has been input after the "N" range, lapse of a time counted by a timer is judged (in a step 1605). In case where it is judged that a predetermined time is elapsed after the step 1604 is affirmed, a failure flag is set (in a step 1606), the present range is regarded as being the "D" range, and an automatic transmission control for the "D" range is executed (in step 1607).

On the other hand, in case where it is judged that the shift range signal is present in the step 1603, the timer is set to To (in a step 1608), and the input shift range signal is stored as a present range (in a step 1609).

In case where the predetermined time is not elapsed in the step 1605, the timer is counted down (in a step 1610).

Figure 17:
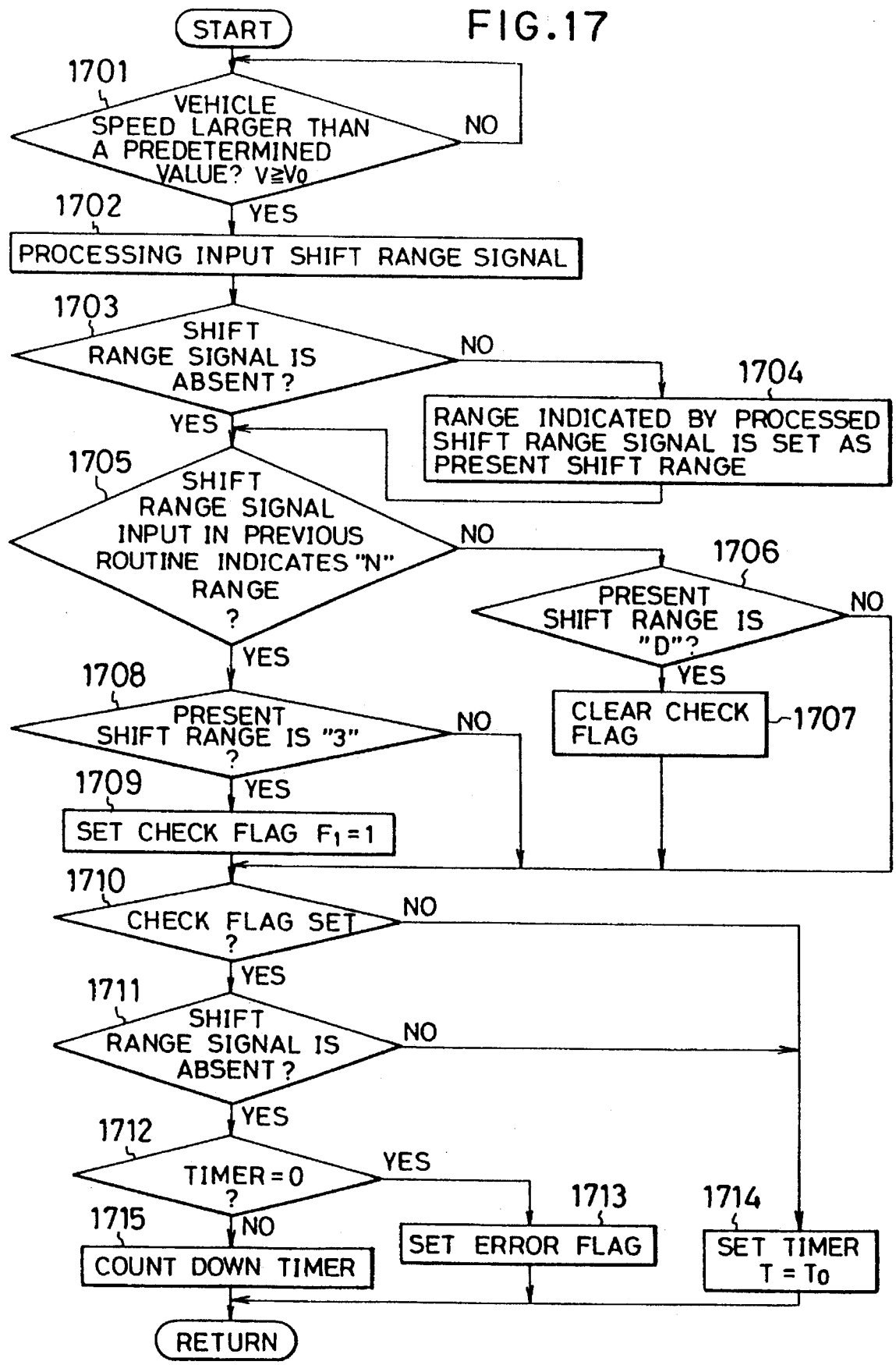
Fig. 17 is a flow chart for explaining an example of the operation of the failure detecting system for a shift range switch signal line according to FIG. 1.

FIG. 17 shows a flow of detecting a failure when a certain range is overlooked.

First, whether the vehicle speed is a predetermined value Vo or more is judged (in a step 1701). When the vehicle speed is higher than the predetermined value, a shift range signal from the inhibitor switch 15 is fetched to the CPU 24 through the input interface circuit 23 (in a step 1702).

Then, whether the shift range signal is input or not is judged (in a step 1703). In case where it is judged that the shift range signal is input, the input signal range is recognized as being the present range (in a step 1704). In case where it is judged that the shift range signal is not input, whether the range detected in previous routine is the "N" range or not is judged (in a step 1705). In case where the "N" range is judged, a check flag is set (in a step 1706). In case where the range in previous routine is not the "N" range, whether the present shift range is "D" range is judged (in the step 1706). When "D" range is judged, the check flag is cleared (in a step 1707).

In case where the range detected in previous routine is "N" range, whether the present range is a "3" range or not is judged (in a step 1708).

In case where the present range is judged to be the "3" range, a check flag $F_1$ is set (in a step 1709). This check flag is set only when the "3" range is detected without the detection of "D" range immediately after the "N" range. In a step 1710, the check flag $F_1$ is judged. When the check flag is set, whether the range signal is input or not is judged (in a step 1711). In case where it is judged that the range signal is absent, whether the timer is "0" or not is judged. In case where a predetermined time To is not elapsed, the timer is counted down (in steps 1712 and 1715). In case where it is judged that the timer is "0", an error flag is set to indicate a failure of the shift range signal (in a step 1713).

In case that the check flag $F_1$ is not set or the shift range signal is present, the timer is set to the predetermined time to (in a step 1714).

Figure 16:
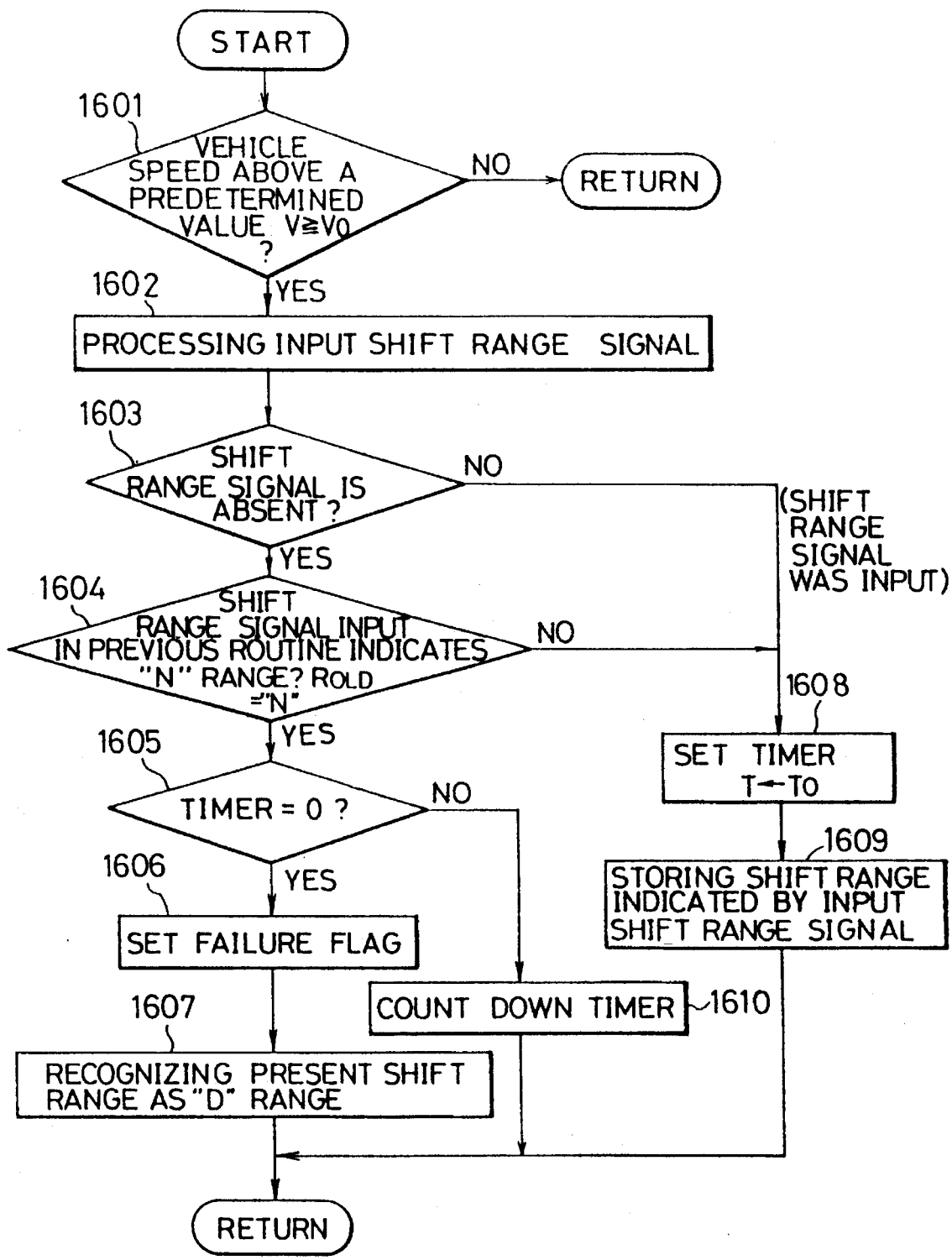
Fig. 16 is a flow chart for explaining an example of the operation of the failure detecting system for a shift range switch signal line according to Fig. 1.

To summarize of the respective flows in FIGS. 16 and 17, the conditions for detecting the failure of the shift range switch is as follows.

(1) No input state is continued for a predetermined time after the "N" range is detected when the vehicle is traveled at a predetermined vehicle speed or higher.

(2) No input state is continued for a predetermined time after the certain range such as the "3" range is detected in case where such the Certain range is detected over the "D" range after the "N" range is detected without the detection of the "D" range after the "N" range is detected when the vehicle is traveled at a predetermined vehicle speed or higher.

In case where any one condition of the above conditions (1) and (2) is satisfied, the gear shift control is conducted. In the case of the above condition (1), it is regarded as being the "D" range, the gear shift control for the "D" range is conducted. In the case of the above condition (2), a trouble is displayed, and the gear shift control for such the certain range is maintained.

Therefore, since the failure of the shift range switch is reliably detected by the foregoing logic, the automatic gear shift control responsive to the shift range switch is suitably conducted without necessity of new failure detecting sensor.

Figure 18:
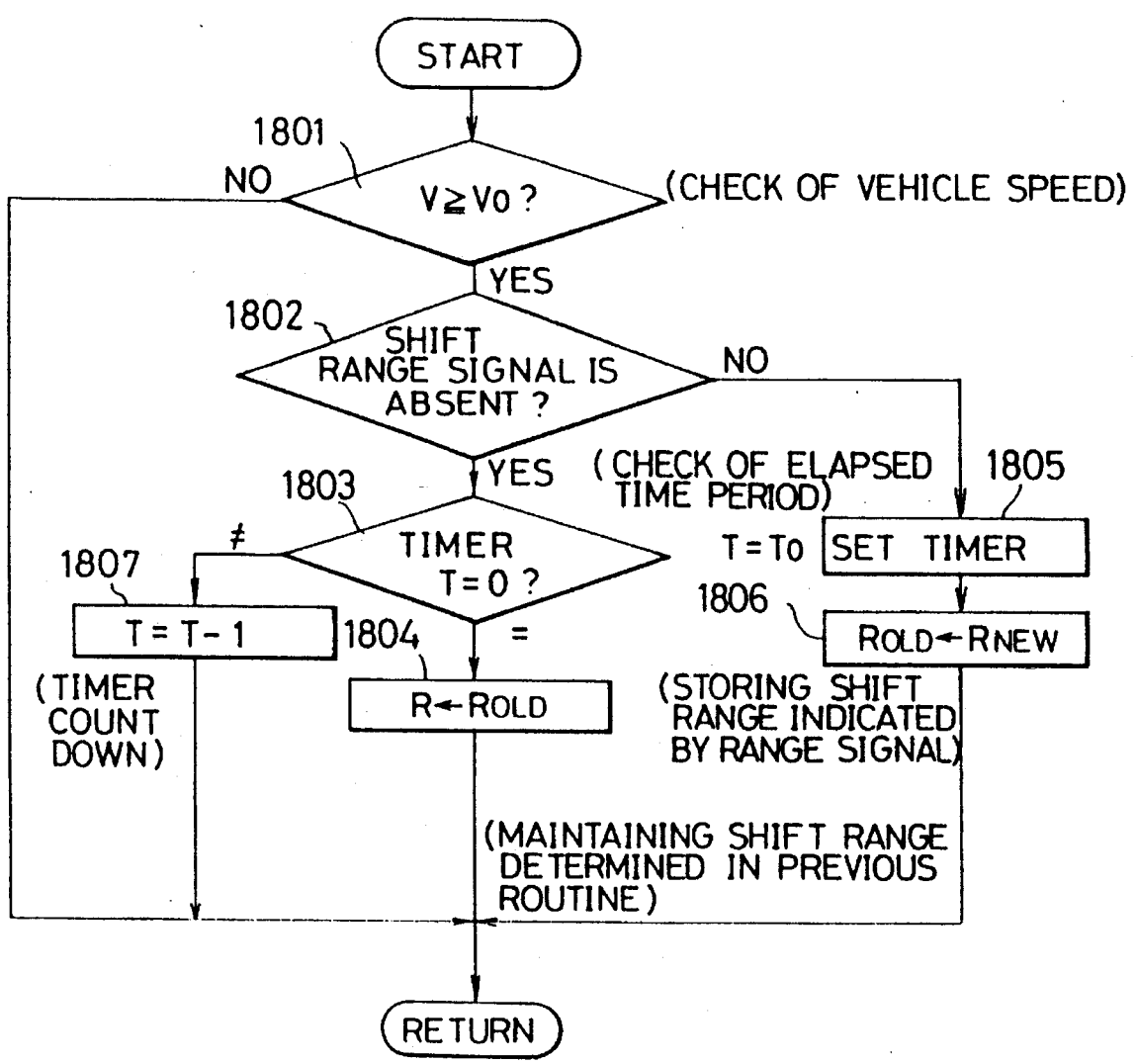
Fig. 18 is a flowchart for explaining an example of the operation Of the failure detecting system for a shift range switch signal line according to FIG. 1.
Figure 19:
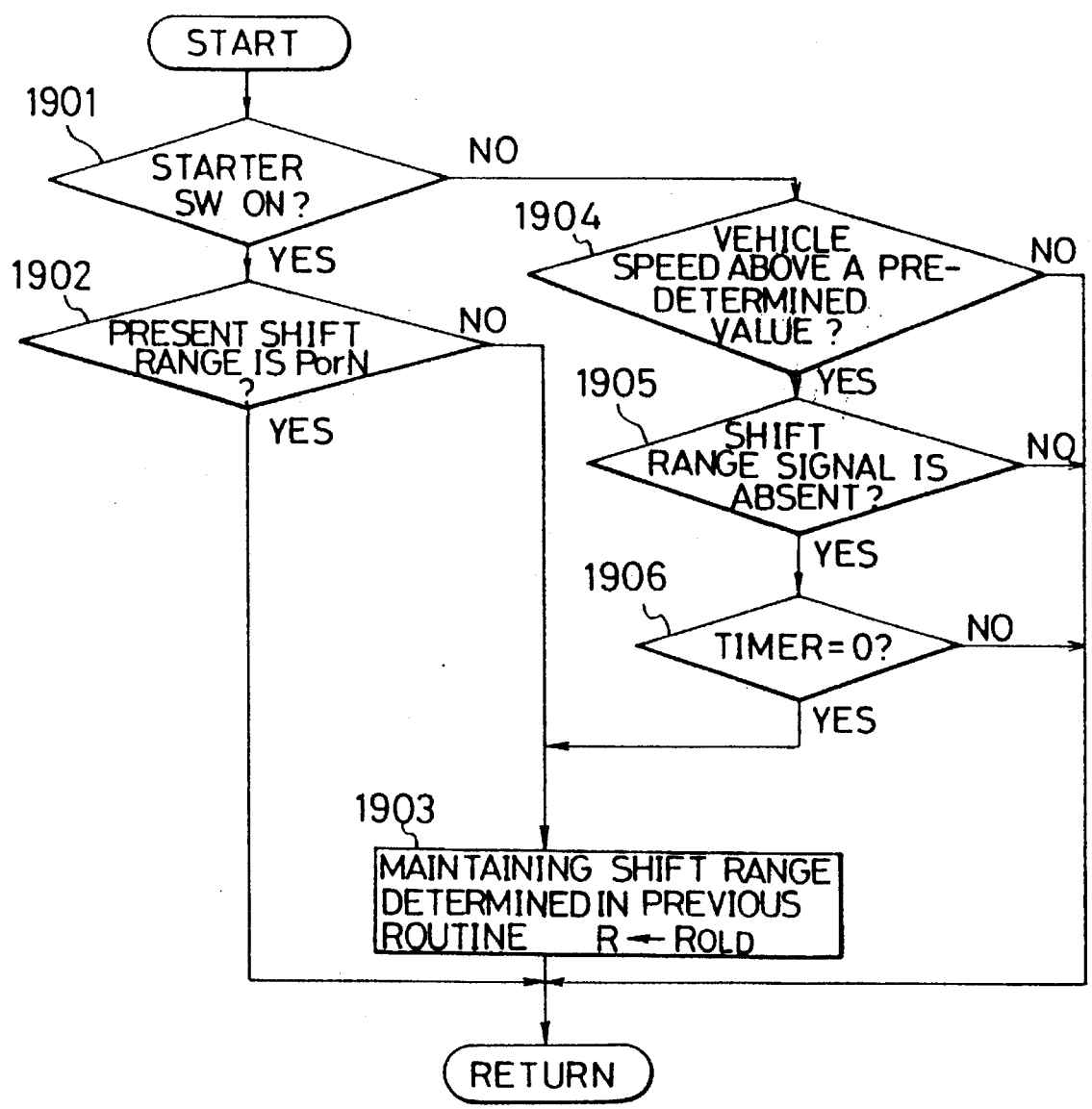
Fig. 19 is a flow chart for explaining an example of the operation of the failure detecting system for a shift range switch signal line according to FIG. 1.

FIGS. 18 and 19 show still another example of the condition to detect the failure of the shift range switch.

First, in case where a shift range signal from the inhibitor switch 15 is not fetched to the CPU 24 through the input interface circuit 23, the vehicle speed detection signal indicative of the vehicle speed from the vehicle speed sensor 13 and presence/absence of the shift range signal are judged (in steps 1801 and 1802).

In case where the Vehicle speed is the predetermined vehicle speed or more and the input shift range signal is present, the timer is set to a predetermined time To (in a step 1805). Then, the input shift range signal is stored as $R_{OLD}$ and the gear shift control for the shift range indicated by the input shift range signal is performed (in a step 1806). In case where the shift range signal is not present, lapse of the time counted by the timer is Judged (in a step 1803). In case where the predetermined time To is not elapsed, the timer is counted down (in a step 1807). In case where the predetermined time To is elapsed, the shift range operated before the shift range signal becomes absent is maintained (in a step 1804).

In FIG. 19, in case where the "P" or "N" range is not recognized from the shift range signal from the inhibitor switch 15 when the starter switch is closed, the previous shift range is maintained (in steps 1901, 1902 and 1903).

On the other hand, when the starter switch is not closed in the step 1901, whether the vehicle speed is faster than the predetermined vehicle speed or not is judged. In case where the vehicle speed is faster than the predetermined vehicle speed, the present input of the shift range signal is judged (in steps 1904 and 1905). In case where it is judged that the shift range signal is not input at present, lapse of the time is judged (in a step 1906). In case where the predetermined time is elapsed after the step 1905 is affirmed, the shift range operated before the shift range signal becomes absent (in a step 1903).

To summarize the flows in FIGS. 18 and 19, the conditions for detecting the failure of the shift range switch is as below. (3) No input state of the shift range at a predetermined vehicle speed or higher is elapsed for a predetermined time. (4) P or N range is not recognized when the starter switch is closed.

In case where any one of the above conditions (3) and (4) is satisfied, the shift range used before the failure occurs is subsequently maintained, and the automatic gear shift control for such the maintained shift range is suitably conducted.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A failure detecting system for an automatic transmission of a vehicle having a vehicle speed sensor mounted on said vehicle for sensing a vehicle speed and for generating a vehicle speed signal indicative thereof, comprising:

a brake switch mounted on said vehicle for detecting whether a brake system is operated or not and for generating a brake signal indicative thereof; and transmission control prohibiting means, responsive to said vehicle speed signal and said brake signal, for prohibiting control of said automatic transmission based on said brake signal when a first predetermined number of times is counted while said vehicle speed decreases from a predetermined speed to a zero speed without detecting operation of said brake system, thereby indicating a failure in said brake system.

2. The failure detecting system according to claim 1, wherein:

said transmission control prohibiting means also prohibits control of said automatic transmission based on said brake signal when a second predetermined number of times is counted while a deceleration rate of said vehicle speed exceeds a predetermined deceleration rate without detecting operation of said brake system.

3. The failure detecting system according to claim 1, wherein:

said transmission control prohibiting means also prohibits control of said automatic transmission based on said brake signal when a deceleration rate exceeds a predetermined deceleration rate without detecting operation of said brake system.

4. A failure detecting system according to claim 1, wherein:

said first predetermined number of times is at least two times.

5. A failure detecting system according to claim 1 wherein;

said failure of said brake system is detected by a system having only one brake switch, and said automatic transmission is accurately controlled independent of said brake signal.

6. A failure detecting system for an automatic transmission of a vehicle having a brake switch mounted on said vehicle for detecting whether a brake system is operated or not and for generating a brake signal indicative thereof, comprising:

an inhibitor switch provided on said automatic transmission for detecting a gear position and for producing a gear range signal indicative thereof; and transmission control prohibiting means, responsive to said brake signal and said gear range signal, for prohibiting control of said automatic transmission based on said brake signal when a first predetermined number of times is counted without detecting operation of said brake system while said gear range signal changes from a parking range to a reverse range, thereby indicating a failure in said brake system.

7. A failure detecting system according to claim 6, wherein;

said failure of said brake system is detected by a system having only one switch, and said automatic transmission is accurately controlled independent of said brake failure.

8. A failure detecting system for an automatic transmission of a vehicle having a vehicle speed sensor mounted on said vehicle for sensing a vehicle speed and for generating a vehicle speed signal indicative thereof and a brake switch mounted on said vehicle for detecting whether a brake system is operated or not and for generating a brake signal indicative thereof, comprising:

transmission control prohibiting means, responsive to said vehicle speed signal and said brake signal, for prohibiting control of said automatic transmission based on said brake signal when a first predetermined number of times is counted without detecting said brake system as being operated while said vehicle speed decreases from a predetermined speed to a zero speed, thereby indicating a failure in said brake system.

9. A failure detecting method for an automatic transmission of a vehicle having a vehicle speed sensor mounted on said vehicle for sensing a vehicle speed indicative thereof, comprising:

detecting whether a brake system is operated or not; and prohibiting control of said automatic transmission based on said brake signal when a first predetermined number of times is counted without detecting said brake system as being operated while said vehicle speed decreases from a predetermined speed to a zero speed, thereby indicating a failure in said brake system.

10. The failure detecting method according to claim 9, wherein:

said prohibiting step further includes prohibiting control of said automatic transmission based on said brake signal when a second predetermined number of times is counted without detecting said brake system as being operated while a deceleration rate of said vehicle speed exceeds a predetermined rate.

11. The failure detecting method according to claim 9, wherein:

said prohibiting step further includes prohibiting control of said automatic transmission when a deceleration rate exceeds a predetermined rate without detecting said brake system as being operated.

12. A failure detecting method according to claim 9, wherein:

said failure of said brake system is detected by a system having only one brake switch, and said automatic transmission is accurately controlled independent of said brake signal.

13. A failure detecting method for an automatic transmission of a vehicle having a brake switch mounted on said vehicle for detecting whether a brake system is operated or not, comprising:

detecting a gear position; and prohibiting control of said automatic transmission based on said brake signal when a predetermined number of times is counted without detecting said brake system as being operated while said gear range signal changes from a parking range to a reverse range, thereby indicating failure of said brake system.

14. A failure detecting method according to claim 13, wherein:

said failure of said brake system is detected by a system having only one brake switch, and said automatic transmission is accurately controlled independent of said brake signal.

* * * * *